Figure 1:
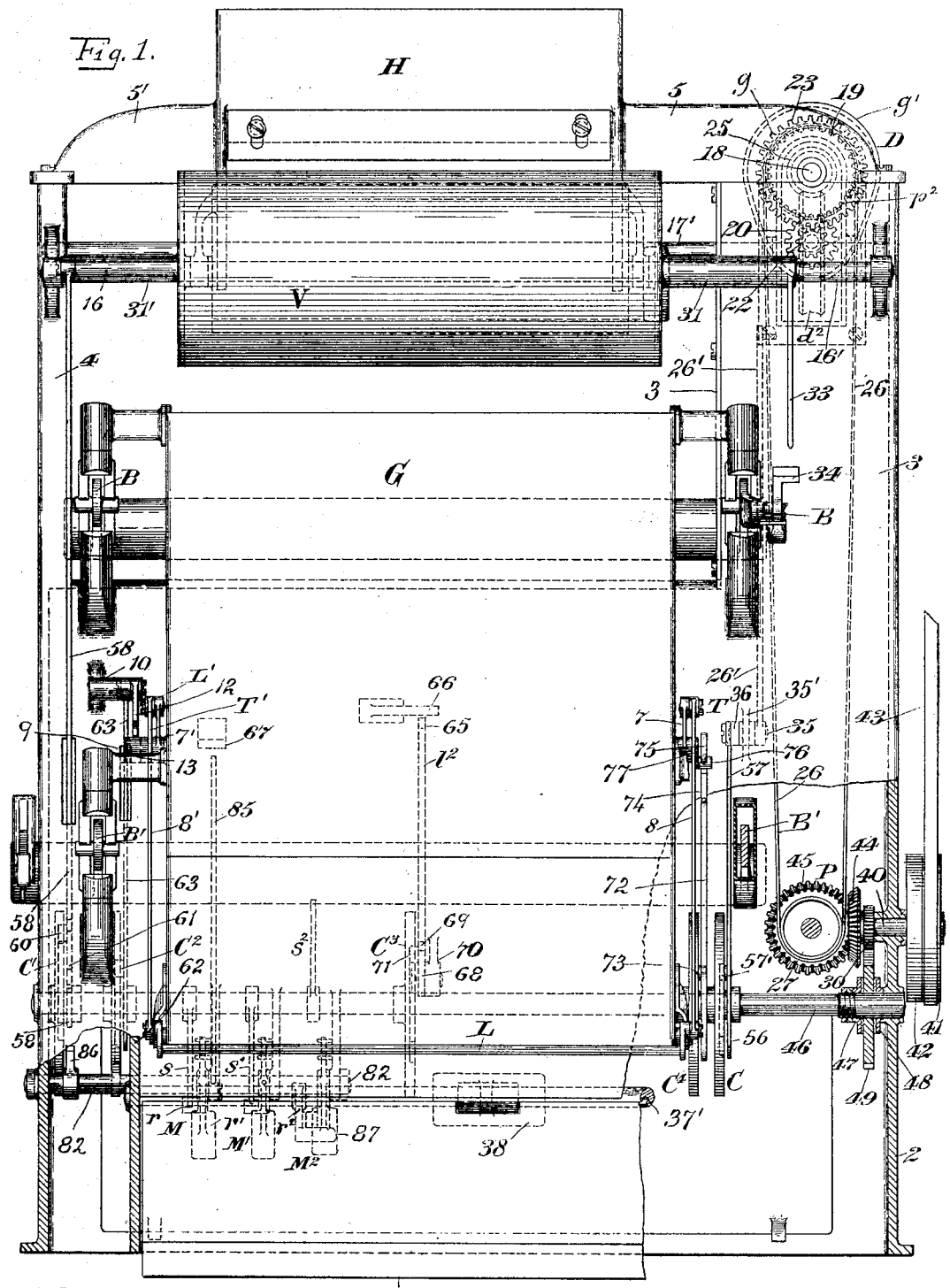

No. 638,672. Patented Dec. 5, 1899.
F. H. RICHARDS.
AUTOMATIC WEIGHING MACHINE.
(Application filed Feb. 9, 1898.)
(No Model.) 20 Sheets—Sheet 1.

Witnesses.
A. B. Mattingly.
Fred. J. Dole.

Inventor
F. H. Richards.

No. 638,672. Patented Dec. 5, 1899.
F. H. RICHARDS.
AUTOMATIC WEIGHING MACHINE.
(Application filed Feb. 9, 1898.)
(No Model.) 20 Sheets—Sheet 5.

Witnesses
A. B. Mattingly
Fred. J. Dole.

Inventor
F. H. Richards.

THE NORRIS PETERS CO., PHOTO-LITHO., WASHINGTON, D. C.

No. 638,672. Patented Dec. 5, 1899.
F. H. RICHARDS.
AUTOMATIC WEIGHING MACHINE.
(Application filed Feb. 9, 1898.)
(No Model.) 20 Sheets—Sheet 7.

Witnesses.
Inventor.

No. 638,672. Patented Dec. 5, 1899.
F. H. RICHARDS.
AUTOMATIC WEIGHING MACHINE.
(Application filed Feb. 9, 1898.)

(No Model.) 20 Sheets—Sheet 8.

Witnesses.
A. B. Mattingly
Fred. J. Dole.

Inventor
F. H. Richards.

No. 638,672. Patented Dec. 5, 1899.
F. H. RICHARDS.
AUTOMATIC WEIGHING MACHINE.
(Application filed Feb. 9, 1898.)

(No Model.) 20 Sheets—Sheet 9.

Witnesses.
A. B. Mattingly
Fred. J. Dole.

Inventor.
F. H. Richards.

No. 638,672. Patented Dec. 5, 1899.
F. H. RICHARDS.
AUTOMATIC WEIGHING MACHINE.
(Application filed Feb. 9, 1898.)
(No Model.) 20 Sheets—Sheet 10.

Witnesses.
A. B. Mattingly
Fred. J. Dole.

Inventor.
F. H. Richards.

No. 638,672. Patented Dec. 5, 1899.
F. H. RICHARDS.
AUTOMATIC WEIGHING MACHINE.
(Application filed Feb. 9, 1898.)
(No Model.) 20 Sheets—Sheet 11.

Witnesses.
A. B. Mattingly
Fred. J. Dole.

Inventor
F. H. Richards

No. 638,672. Patented Dec. 5, 1899.
F. H. RICHARDS.
AUTOMATIC WEIGHING MACHINE.
(Application filed Feb. 9, 1898.)

(No Model.) 20 Sheets—Sheet 12.

Witnesses.
A. B. Mattingly
Fred. J. Dole.

Inventor.
F. H. Richards.

No. 638,672. Patented Dec. 5, 1899.
F. H. RICHARDS.
AUTOMATIC WEIGHING MACHINE.
(Application filed Feb. 9, 1898.)

(No Model.) 20 Sheets—Sheet 14.

Witnesses
A. B. Mattingly
Fred J. Dole.

Inventor
F. H. Richards

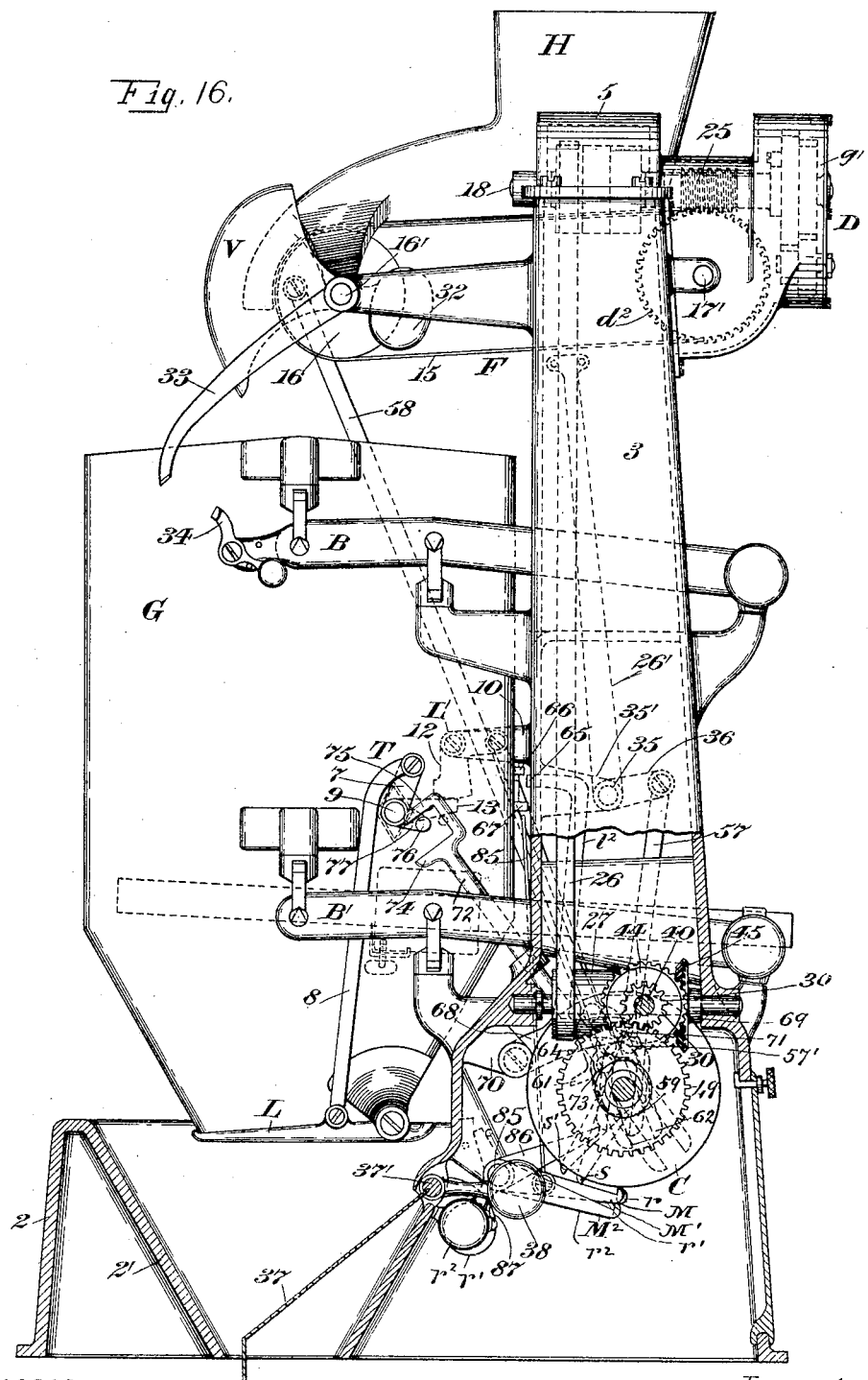

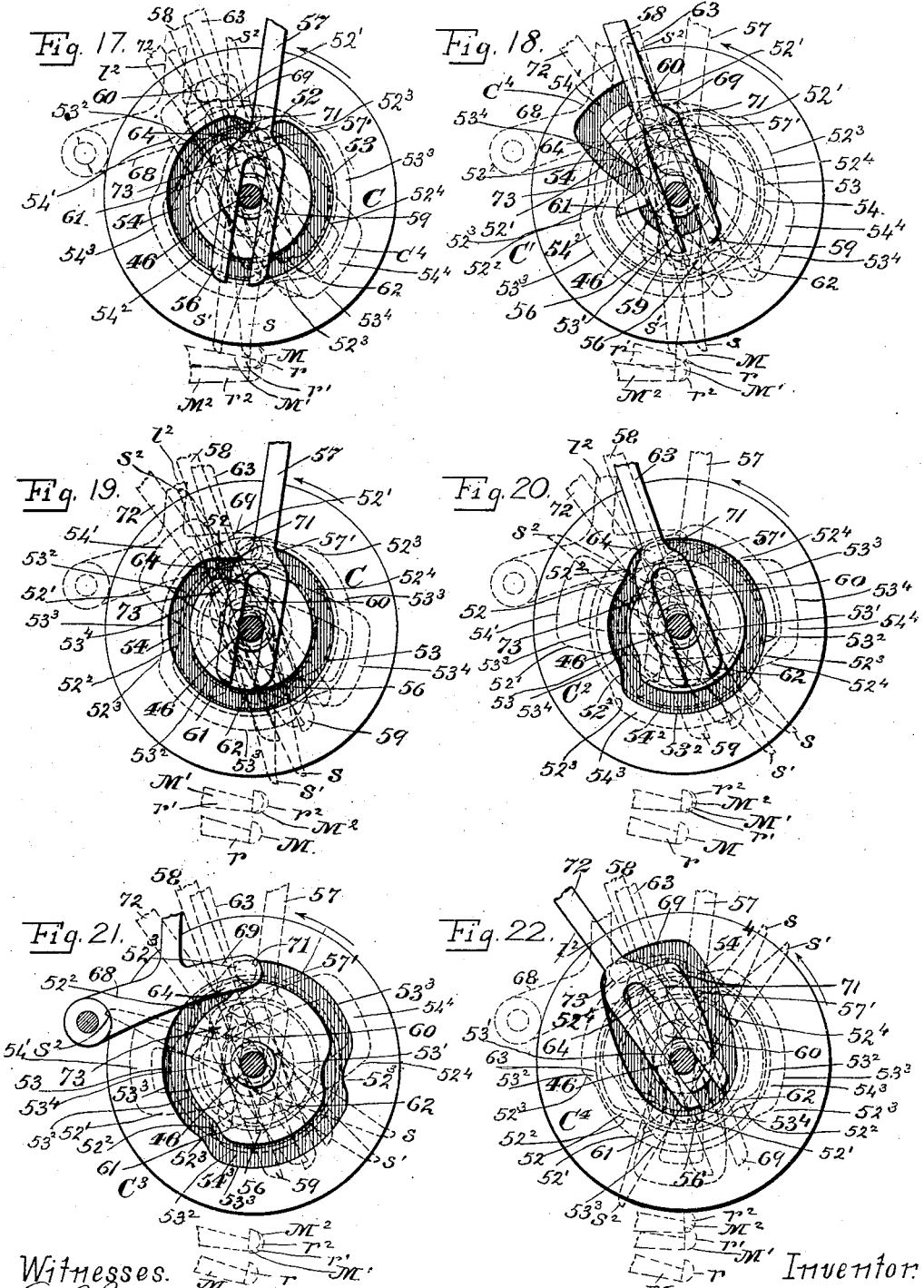

No. 638,672. Patented Dec. 5, 1899.
F. H. RICHARDS.
AUTOMATIC WEIGHING MACHINE.
(Application filed Feb. 9, 1898.)
(No Model.) 20 Sheets—Sheet 18.
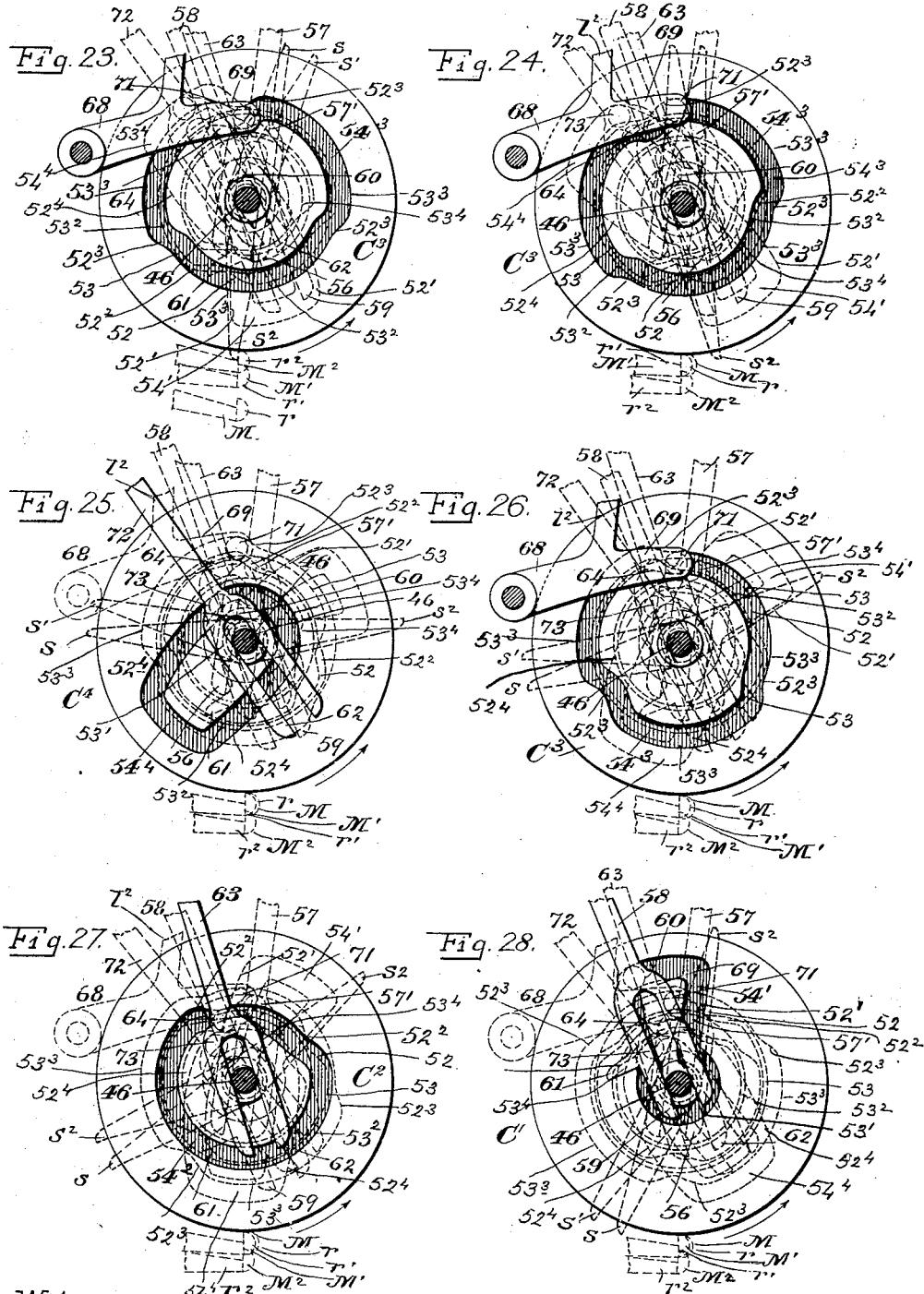
Witnesses.
Inventor.

No. 638,672. Patented Dec. 5, 1899.
F. H. RICHARDS.
AUTOMATIC WEIGHING MACHINE.
(Application filed Feb. 9, 1898.)
(No Model.) 20 Sheets—Sheet 19.
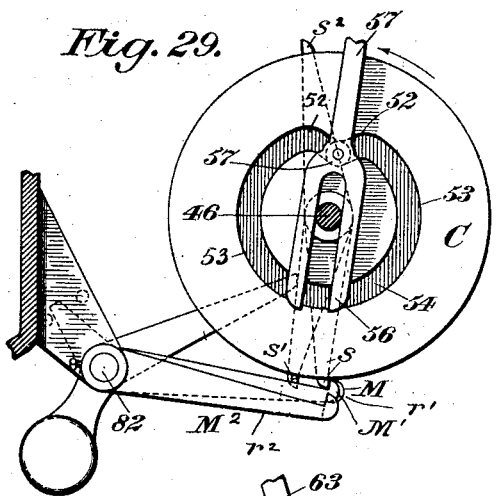
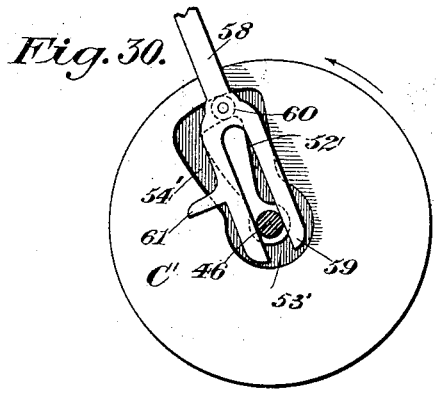
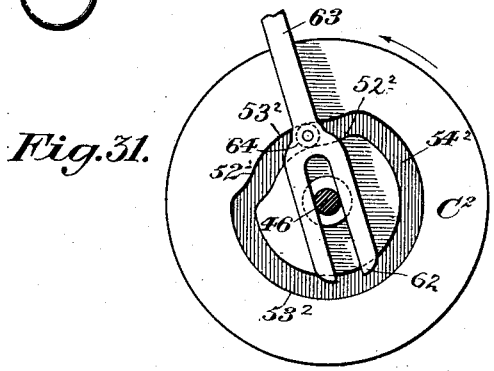
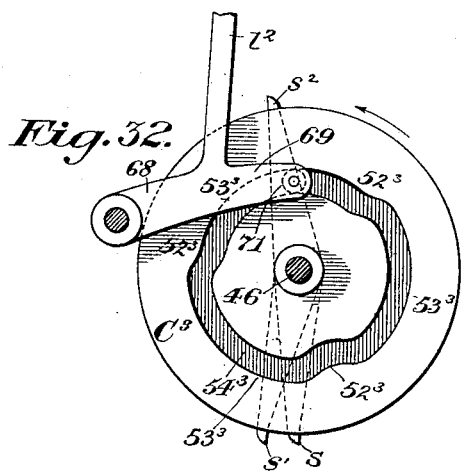
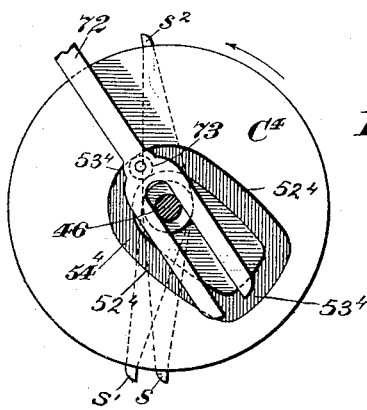
Witnesses:
Inventor:
F. H. Richards No. 638,672. Patented Dec. 5, 1899.
F. H. RICHARDS.
AUTOMATIC WEIGHING MACHINE.
(Application filed Feb. 9, 1898.)
(No Model.) 20 Sheets—Sheet 20.
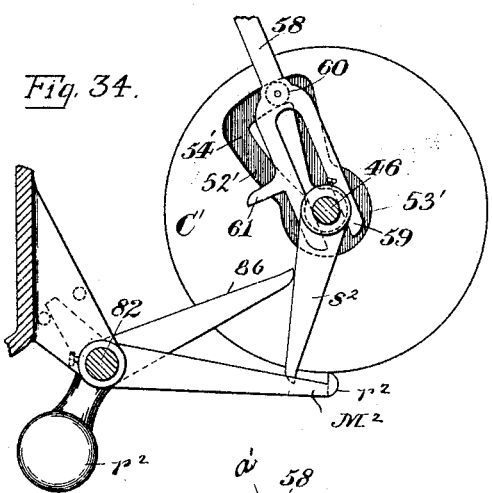
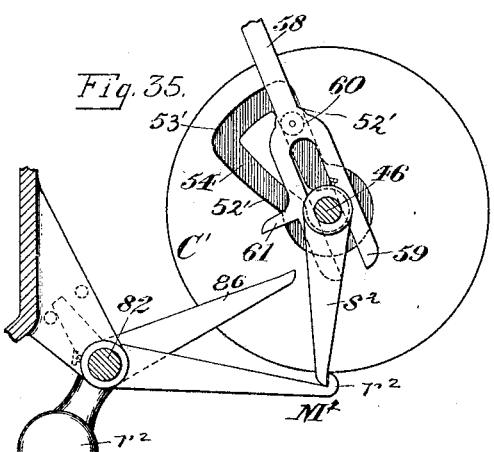
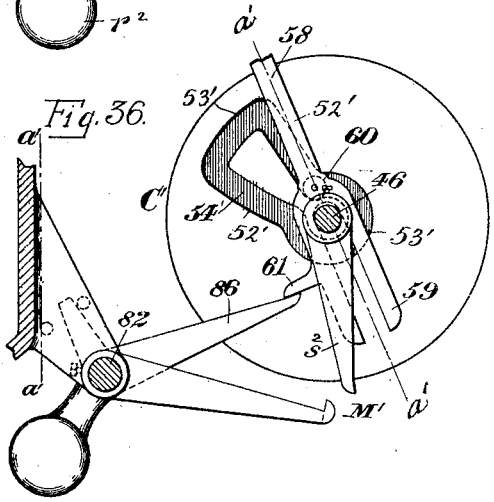
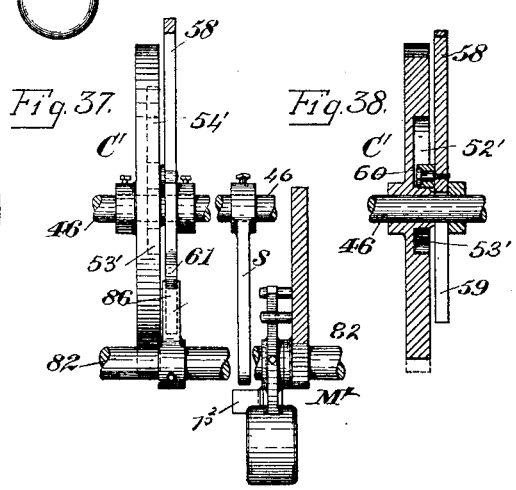
Witnesses.
A. B. Mattingly
Fred J. Dole
Inventor
F. H. Richards

UNITED STATES PATENT OFFICE.

FRANCIS H. RICHARDS, OF HARTFORD, CONNECTICUT, ASSIGNOR, BY MESNE ASSIGNMENTS, TO THE NEW ENGLAND AUTOMATIC WEIGHING MACHINE COMPANY, OF PORTLAND, MAINE.

AUTOMATIC WEIGHING-MACHINE.

SPECIFICATION forming part of Letters Patent No. 638,672, dated December 5, 1899.

Application filed February 9, 1898. Serial No. 669,706. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Weighing-Machines, of which the following is a specification.

This invention relates to automatic weighing-machines; and one object thereof is to furnish an improved machine comprehending power-driven mechanism for actuating and for controlling the sequential operations of the various submechanisms or subdevices—such as the material-feeder, stream-controller or valve, load-receiver, load-discharger or closer, &c.—and to so construct and organize the elements of said power-driven mechanism that the different instrumentalities will be operated in proper successive order, whereby during the operation of one submechanism one or more of the other submechanisms will be positively held out of action as required.

Another object of the invention is to provide, in connection with the several submechanisms of a weighing-machine, a universal interlocking rotative actuator in operative connection with all of said submechanisms, means for rotating said actuator, movement-limiters or interrupting devices in connection with the universal actuator and effective for stopping or interrupting the movement of the actuator a plurality of times in each complete rotation thereof, the number of interruptions preferably corresponding to the number of subactions of the submechanisms in a complete operation of the machine, and means operative on the completion of successive subactions of said submechanisms for releasing the interrupting devices, thereby to permit successive rotative movements of said actuator.

A further object of the invention is to provide, in connection with a movable element of a weighing-machine, a combined actuating and locking device in operative connection with said element and comprising a power-rotated cam having an element-actuating portion and an element-locking portion at different points in its circumference, power-driven mechanism for operating said cam, and means for intermittently arresting the movement of said cam.

A further object of the invention is to provide, in connection with weighing mechanism including a load-receiver having a closer and with supply means having a valve, a compound actuating device connected with and operable independent of the valve and closer, respectively, and reciprocally effective for actuating said valve and closer, one independent of the other, said actuating device including two rotary coaxial stop members.

A further object of the invention is to provide an improved weighing-machine including a load-receiver having a closer, a supply apparatus embodying a valve, and mutually-dependent means operative independent of the valve and closer and effective for preventing an opening movement of the valve on the opening of the closer and for preventing the opening movement of the closer on the opening of the valve.

Figure 2:
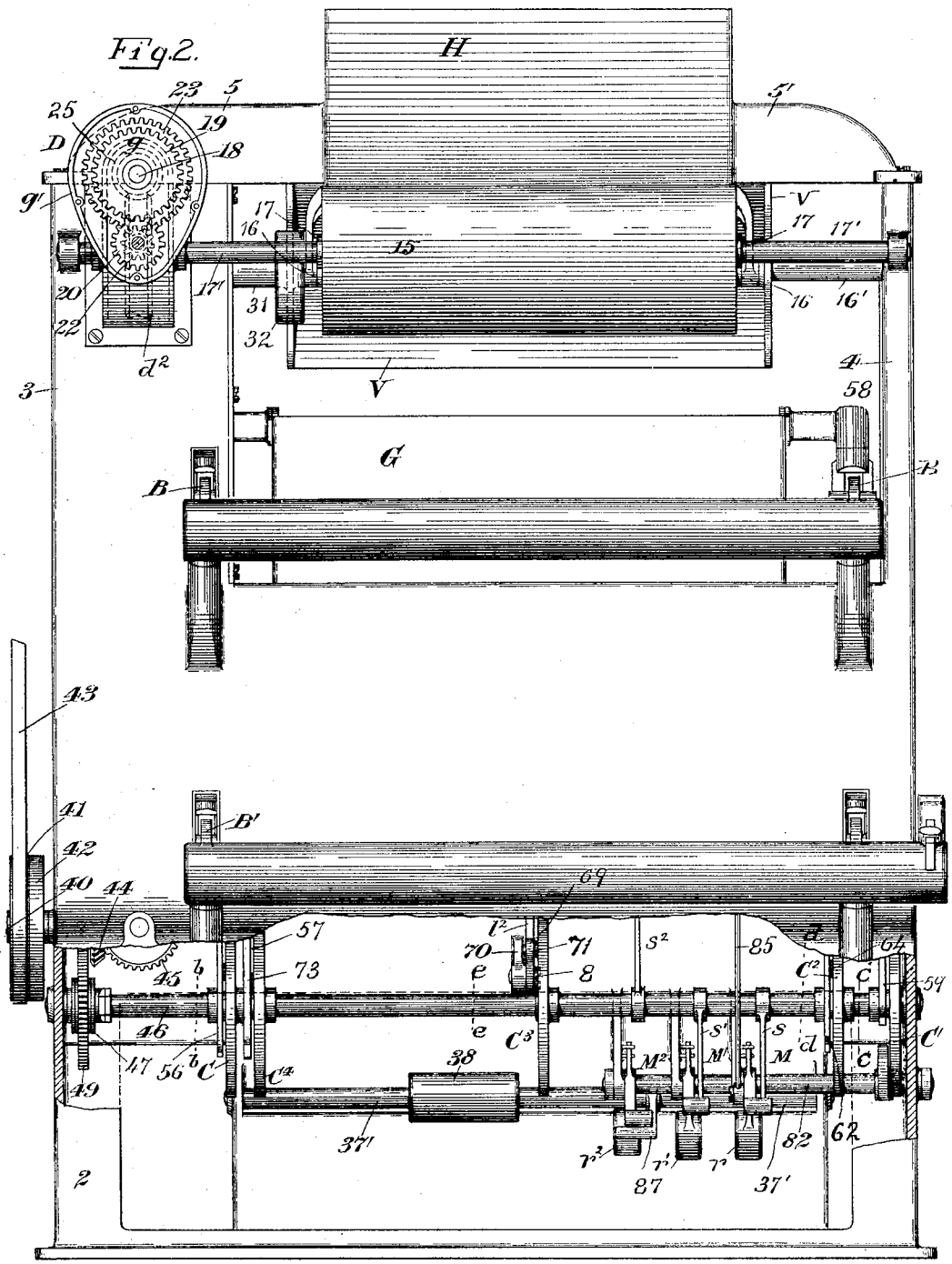
Figure 3:
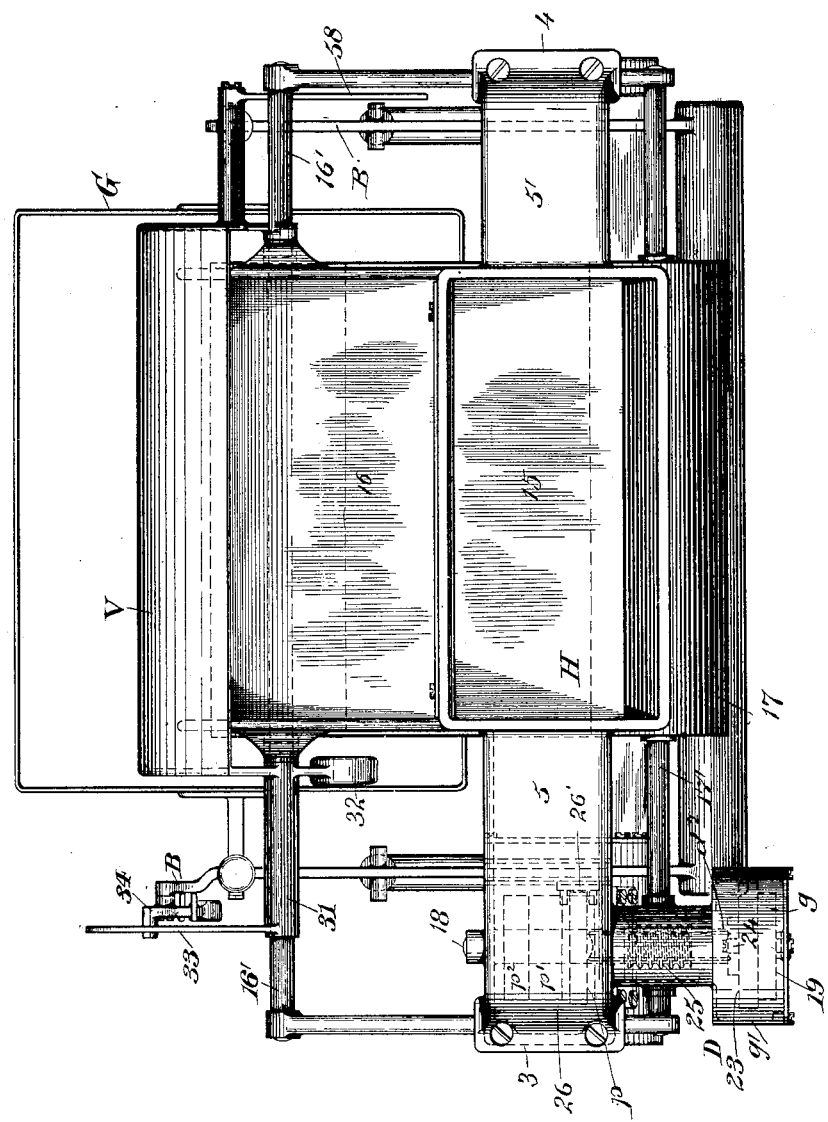
Figure 4:
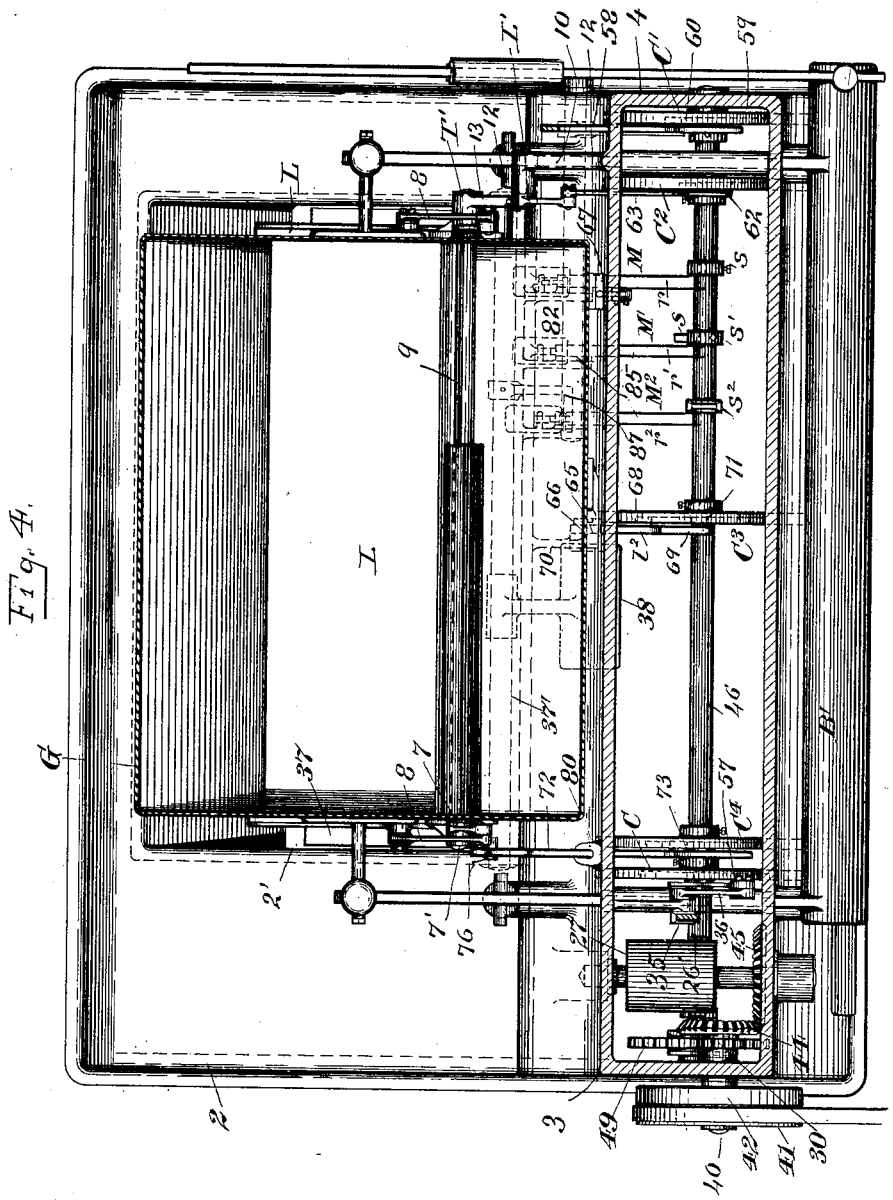
Figure 5:
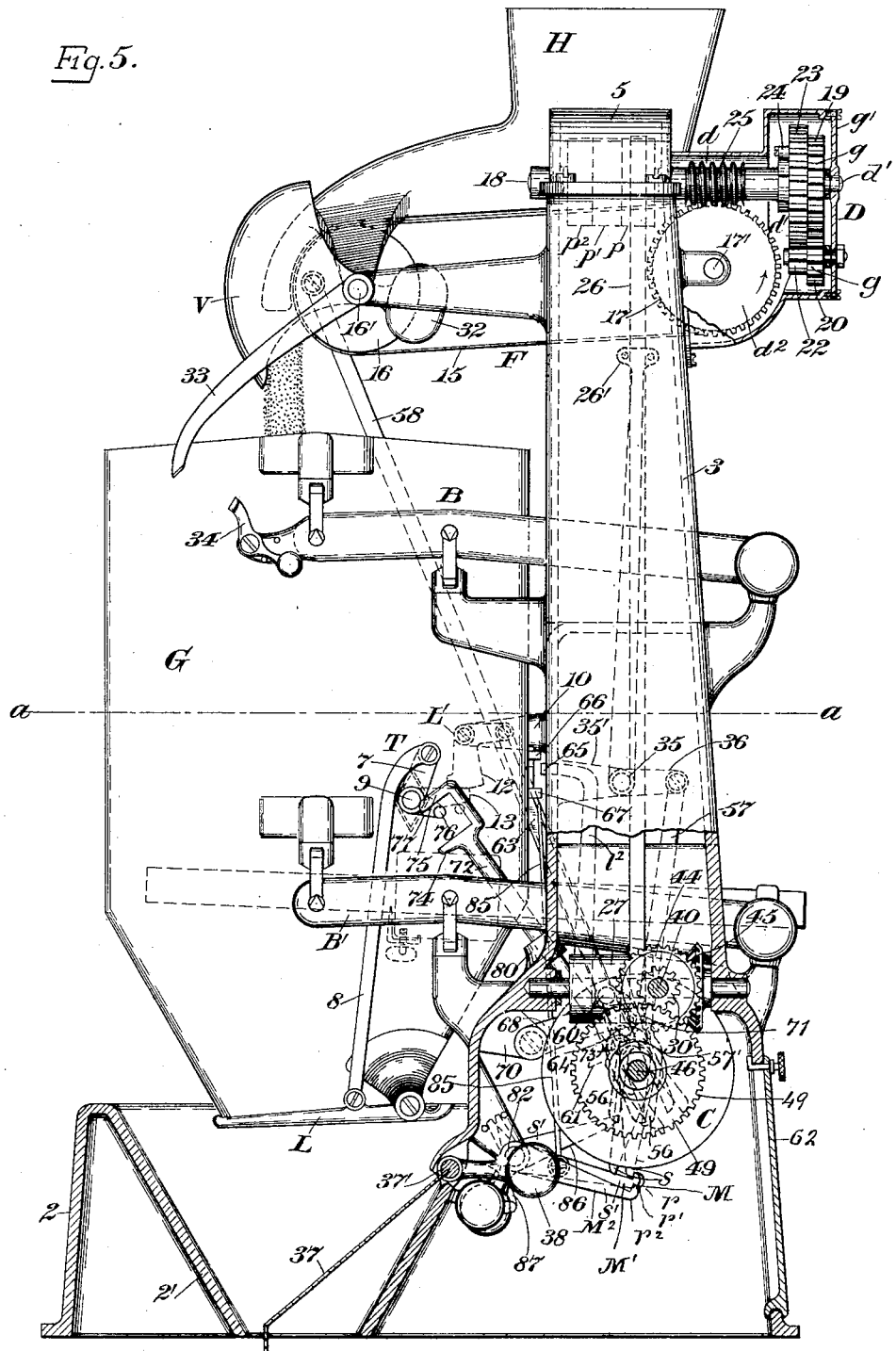

In the drawings accompanying and forming part of this specification, Figure 1 is a front elevation, partially in section, of a weighing-machine embodying my present invention, parts of the framework being broken away. Fig. 2 is a rear elevation of the machine as seen from the right in Fig. 5, a portion of the framework being broken away. Fig. 3 is a plan view of the weighing-machine. Fig. 4 is a horizontal cross-section of the weighing-machine, taken on a line corresponding with the dotted line *a a*, Fig. 5, showing the parts below said dotted line. Figs. 5, 6, 7, 8, 9, 10, 11, 12, 13, 14, 15, and 16 are side elevations, partially in section, of the weighing-machine as seen from the right in Fig. 1, showing the several submechanisms and subsidiary devices in twelve successive positions they occupy during one complete cycle of operations or during the making up and weighing of a load. Figs. 17, 18, 19, 20, 21, 22, 23, 24, 25, 26, 27, and 28 are cross-sectional views of portions of the universal or secondary actuator of the compound actuating mechanism for the several submechanisms, showing in full and dotted lines the several submechanism-controlling cams in positions corresponding, respectively, to the positions thereof illustrated in Figs. 5 to 16, inclusive, or in the twelve successive positions they occupy during one complete weighing operation, each figure showing in full lines a cam and a portion of a power-transmitter or actuating-connector in a position for imparting an effective movement to an element of the machine and showing in dotted lines the other cams in element-locking positions. Figs. 29, 30, 31, 32, and 33 are cross-sectional views of portions of the universal interlocking actuator on lines corresponding with the dotted lines b b, c c, d d, e e, and f f, Fig. 2, as seen from the left in said figure, and showing the five subactuators—to wit, the cams and parts of the connectors—which control the movements of the several submechanisms of the weighing-machine, the parts illustrated in said figure being shown in the relative positions they occupy to one another when the parts of the weighing-machine are in the positions illustrated in Fig. 5. Fig. 29 of this group also shows in full and dotted lines certain of the movement-limiters or devices which control the intermittent movements of the secondary or universal actuator. Figs. 34, 35, and 36 are sectional views similar to Fig. 29 of a portion of the universal or secondary actuator and its stopping devices and show the valve-controlling cam in the three successive positions it occupies when the valve is in its wide-open position, in its drip position, and in its fully-closed position, respectively. Fig. 37 is a front view of a portion of the secondary or universal actuator, certain parts being broken away, as seen from the right in Fig. 36. Fig. 38 is a cross-sectional view of the valve-actuating cam and a portion of the actuating-connector between said valve and cam, taken in dotted line a' a', Fig. 36, as seen from the left in said figure.

Similar characters of reference designate like parts in all the figures of the drawings.

The framework for supporting the several submechanisms and other parts of the weighing-machine may be of any suitable general construction, and comprises, in the form thereof shown in the accompanying drawings, a supporting-base 2, having at one side thereof, preferably formed integral therewith, a discharge hopper or chute 2', two vertical columns or side frames 3 and 4, extending upward from the base 2 in the rear of the chute 2', and a supply-hopper H, supported between and having outwardly-extending brackets 5 and 5' fixed to the upper ends of the side frames 3 and 4, respectively.

The weighing mechanism proper comprises a load-receiver and suitable beam mechanism therefor.

The beam mechanism which supports the load-receiver is shown of substantially the same general construction and organization as the beam mechanism illustrated in Patent No. 570,291, granted to me October 27, 1896, and comprises two counterweighted scale-beams, (designated by B and B') respectively located one above the other and fulcrumed in the usual manner on brackets extending outward from the side frames, and a load-receiver, which is shown of the well-known "single-chambered-bucket" type and which is supported substantially midway of its width on the poising or non-counterweighted ends of said scale-beams in the same manner substantially as that described in the patent referred to.

The load-receiver, which is designated in a general way by G and which constitutes one of the submechanisms of the weighing-machine, is furnished at the discharge end thereof with a shiftable load-discharger or closer L, which may be of any suitable general construction and which is shown pivotally supported in the usual manner between brackets fixed to the lower rear portions of the side walls of the load-receiver.

The closer L, which constitutes one member of another submechanism of the weighing-machine—to wit, the load-discharging mechanism—is retained in its shut position by means which, in the form thereof shown in the accompanying drawings, comprise inverted closer-sustaining toggles T T', which are shiftable to the right of their dead-center positions for holding the closer normally shut, and in cooperative relation with said toggles I have provided a latch L' for engaging and normally holding the toggle T, and through rock-shaft 9 toggle T', against accidental displacement from their closer-sustaining positions. These closer-sustaining toggles each embody two members, which are designated, respectively, by 7 and 7' and 8 and 8', the parts 7 and 7' being in the nature of crank-arms fixed to a rock-shaft 9, extending through and supported in opposite walls of the load-receiver, and the parts 8 and 8' being shown as closer-sustaining members connected at their lower ends to the closer L and pivotally secured at their upper ends to the outer ends of the members 7 and 7', said members being so disposed that when the closer is in its shut position, as illustrated in Fig. 5, the pivotal points of the parts 7 and 7' and 9 will be to the right-hand sides of their dead-center positions—that is to say, the axis of the rock-shaft 9 while located between is out of alinement with the pivotal points of the closer-sustaining members 8 and 8'. This construction constitutes a "dead-lock" toggle, and by the employment thereof the closer is held in its shut position until the toggles are mechanically released, as hereinafter described.

The closer-latch L' is shown somewhat in the nature of an angle-lever fulcrumed intermediate its ends on a bracket 10 on the framework and having a depending arm 12 shiftable into the path of movement of an arm 13, fixed to the rock-shaft 9, to which the closer-sustaining toggles T T' are secured, said arm 13, when the closer L is in its shut position, having its upper face in a substantially horizontal plane and abutting against the under face of the arm 12 of said latch, whereby an opening movement of the closer is prevented until the proper time.

The load-supplying apparatus of the weighing-machine comprises, in addition to the supply-hopper hereinbefore mentioned, other submechanisms and those known as "force-feeding" mechanisms (designated in a general way by F) and coöperative stream-controlling or valve mechanism, (designated in a general way by V,) which will now be described.

The force-feeding mechanism in the preferred construction and organization thereof comprises an endless band feeder 15, supported for circuitous movement, with its upper run below and in close proximity to the discharge end of the hopper H, on feed-rolls 16 and 17, the shafts 16' and 17' of which are journaled in suitable bearings on the framework, one above the central portion of the load-receiver and the other slightly in the rear of the supply-hopper, and a differential speed-driving device (designated in a general way by D) in operative connection with and effective for controlling the material-feeding velocity of the endless feeder 15.

The differential speed-driving device for the feeder may be of substantially the same general construction and organization as the differential speed-driving mechanism shown and described in my Letters Patent No. 607,478, dated July 19, 1898, and is shown (see Figs. 2 and 5 to 16 of the drawings) comprising a primary driver $d$ and a secondary driver $d'$, connected by a train of speed-reducing gears $g$, including a clutch device operative on the rotation of one driving member for coupling the same to and rotating the other driving member, and a driving member $d^2$, (shown as a worm-wheel,) fixed to the shaft 17' of the feed-roll 17.

The secondary driver $d'$ consists of a horizontally-disposed shaft 18, journaled at its outer end in the wall of a gear-case $g'$ and at its inner end in a bearing on the framework, and has fixed at its outer end a spur-wheel 19, which meshes with a pinion 20, mounted on a stud fixed in the end wall of said gear-case, and which stud also carries a similar pinion 22, rotatably mounted on its inner end and meshing with a spur-wheel 23, rotatably supported on the shaft 18, said spur-wheel 23 being shown of larger diameter than the fixed spur-wheel 19 and having a pawl 24 pivotally supported on the inner face thereof, and the primary driver comprises a worm 25, rotatably mounted on the shaft 18 of the secondary driver and having a ratchet at the outer end of the hub thereof adapted to be engaged by the pawl 24 in a manner like the shaft shown and described in the Letters Patent hereinbefore referred to, whereby said worm may be rotated, through the medium of the shaft 18 and intermeshing differential gears, when said shaft is driven direct, and the ratchet may ride under said pawl when the worm is driven direct, as hereinbefore described. This worm 25 meshes with and is adapted for rotating the worm-wheel $d^2$.

As a means for rotating the primary driver direct the hub of the worm has fixed thereto a pulley $p$, which, for convenience, will be hereinafter termed the "high-speed" pulley, and as a means for rotating the primary driver through the medium of the secondary driver and at a slower speed the shaft 18 of said secondary driver has what may be termed a "low-speed" pulley $p'$ fixed thereto, and as a means for stopping the rotation of the two drivers I have provided the shaft 18 with a "loose" pulley $p^2$. These pulleys, which are of substantially the same diameters and set side by side, will be driven by a belt 26, extending, at the lower end of its run, over a drum 27, having a length equal to the aggregate widths of the three pulleys $p$, $p'$, and $p^2$, and which drum will be rotated from the primary actuator of the main driving or actuating mechanism of the machine in the manner hereinafter described.

Figure 6:
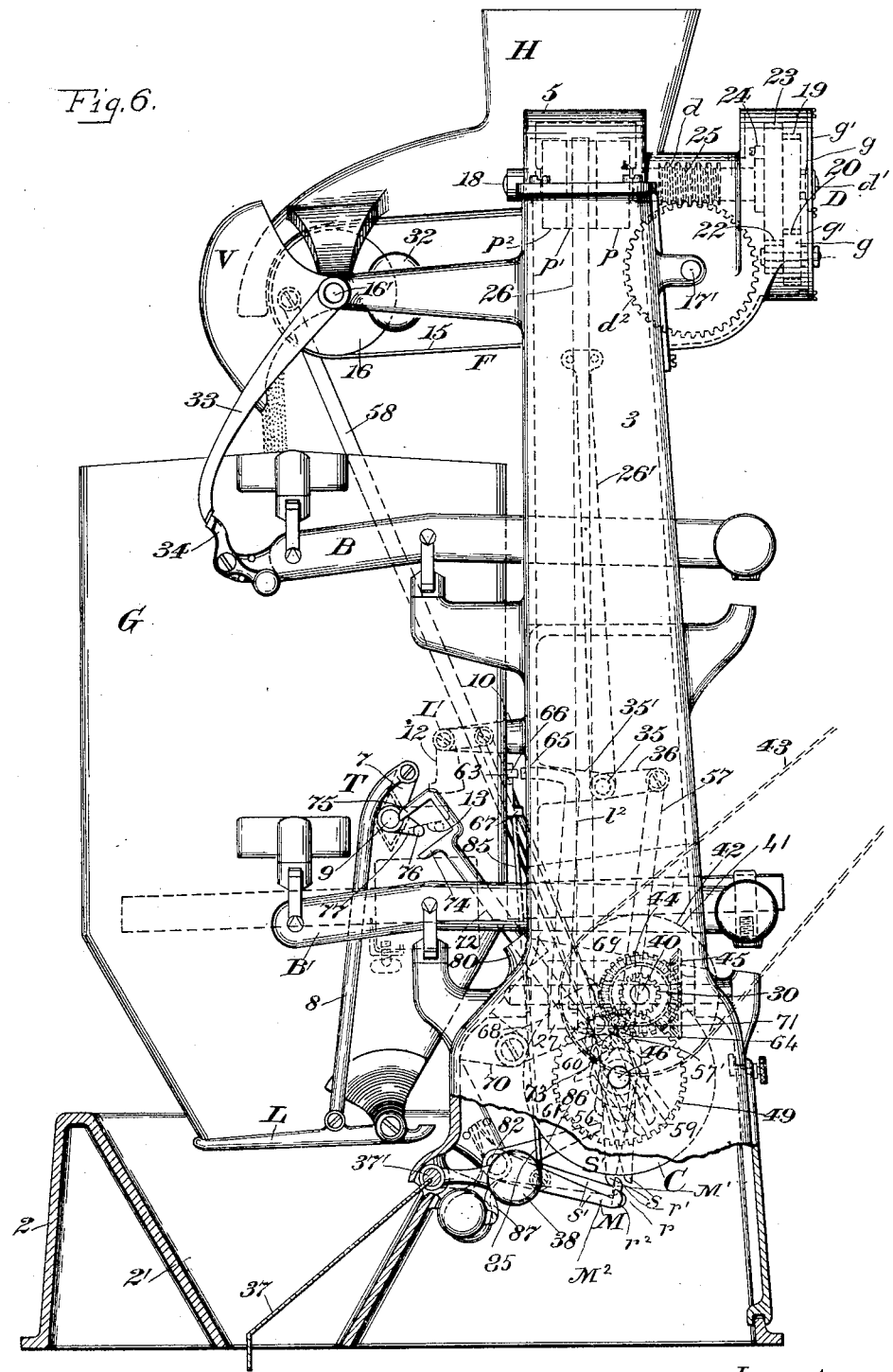
Figure 7:
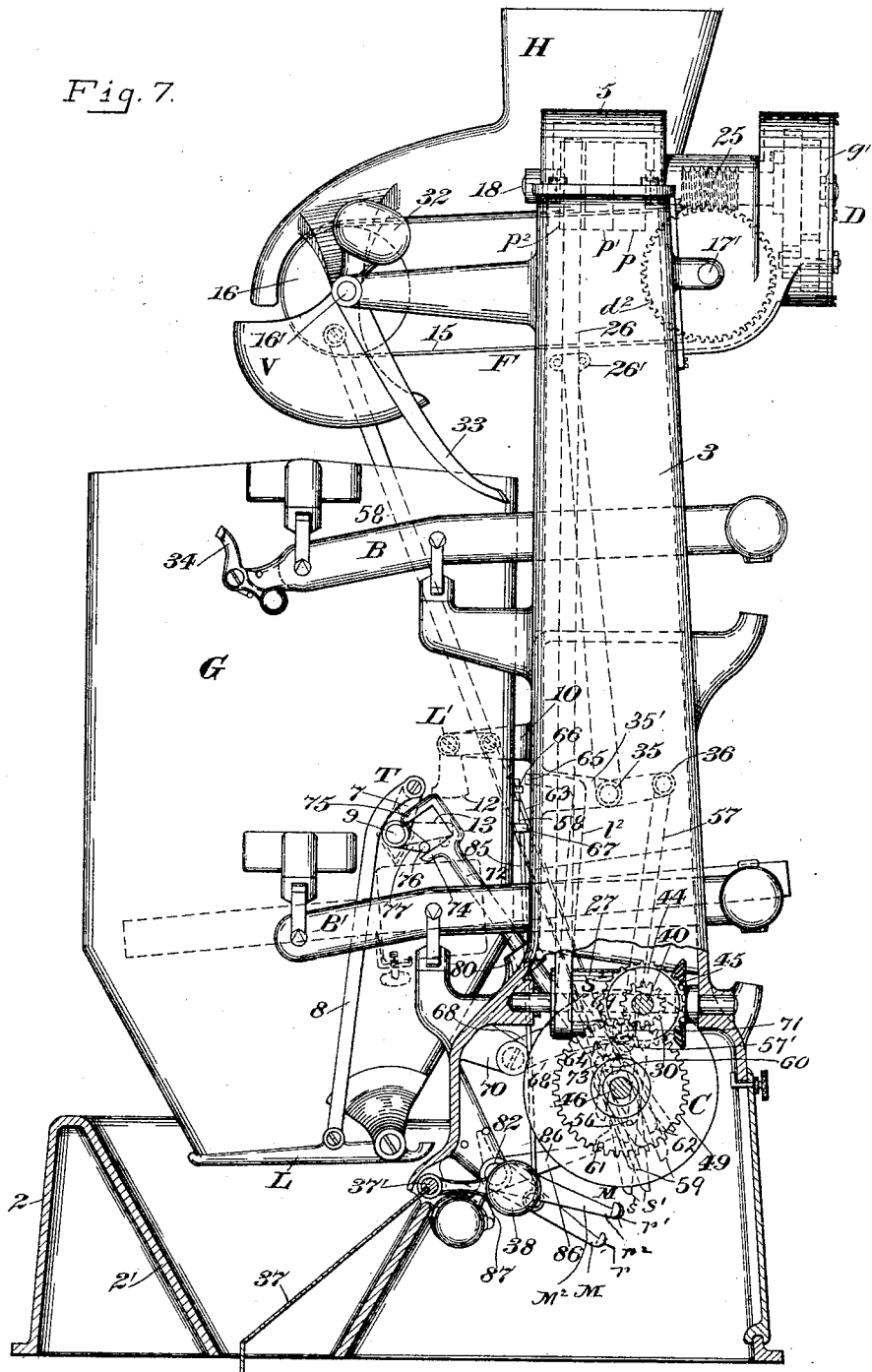

When the belt 26 is shifted onto and is rotating the pulley $p$, at which time the stream-controller of the supply mechanism is in its wide-open position, as shown in Fig. 5, the worm 25 will be rotated direct at a high rate of speed and will impart a high velocity to the endless band feeder, and when said belt is shifted from the high-speed pully $p$ to the low-speed pulley $p'$, at which time the stream-controller is in its drip position, as shown in Fig. 6, the worm 25 will be indirectly rotated at a comparatively low rate of speed through the medium of the shaft 18 and intermeshing differential gears $g$, and when said belt is shifted to the loose pulley $p^2$, as shown in Fig. 7, at which time the stream-controller will be in its cut-off position, the operation of the worm and connected worm-wheel which drives the endless band feeder will be arrested, as will be readily understood by comparison of the figures of the drawings referred to.

While I prefer to use a force-feeding mechanism substantially of the construction and organization illustrated in the accompanying drawings, it is distinctly to be understood that the invention is not limited to any particular form of construction or organization of mechanism for supplying material to the load-receiver.

The stream-controlling mechanism, which may be of any suitable general construction and organization, comprises, in the form thereof shown in the accompanying drawings, a gravitative scoop-valve V, having an outwardly-extending tubular hub 31 at one end, mounted on the shaft 16', which extends through said hub; a counterweight 32, fixed to said hub in position for partially balancing said valve, and a by-pass arm or valve-arrester 33, also fixed to the end of said hub 31 in position for engaging during the first portion of the closing movement of the valve a counterweighted by-pass 34, pivotally secured to the inner non-counterweighted end of the scale-beam B, which by-pass and arm hold said valve in its drip position until the bucket descends sufficiently to release said by-pass arm and permit said valve to fully close.

In connection with the belt 26 I have provided a belt-shipper 26', which is fixedly secured at its lower end to a rock-shaft 35, journaled in a bracket 35' on the framework within the hollow side frame 3 of the machine. (See Fig. 10.) Said rock-shaft 35 has a rearwardly-extended crank-arm 36, to which is connected one member of the belt-shipping actuating device, as will be hereinafter more fully described.

In connection with the chute 2' of the base 2 of the framework I have provided a regulator, which is shown as a plate 37, fixed at one end to a rock-shaft 37', journaled at opposite ends in the side wall of the base 2 below and slightly in the rear of the pivotal point of the closer of the load-receiver, said shaft having fixed thereto a counterweight 38 for normally retaining said plate 37 in its elevated position, as shown in Fig. 5.

Figure 10:
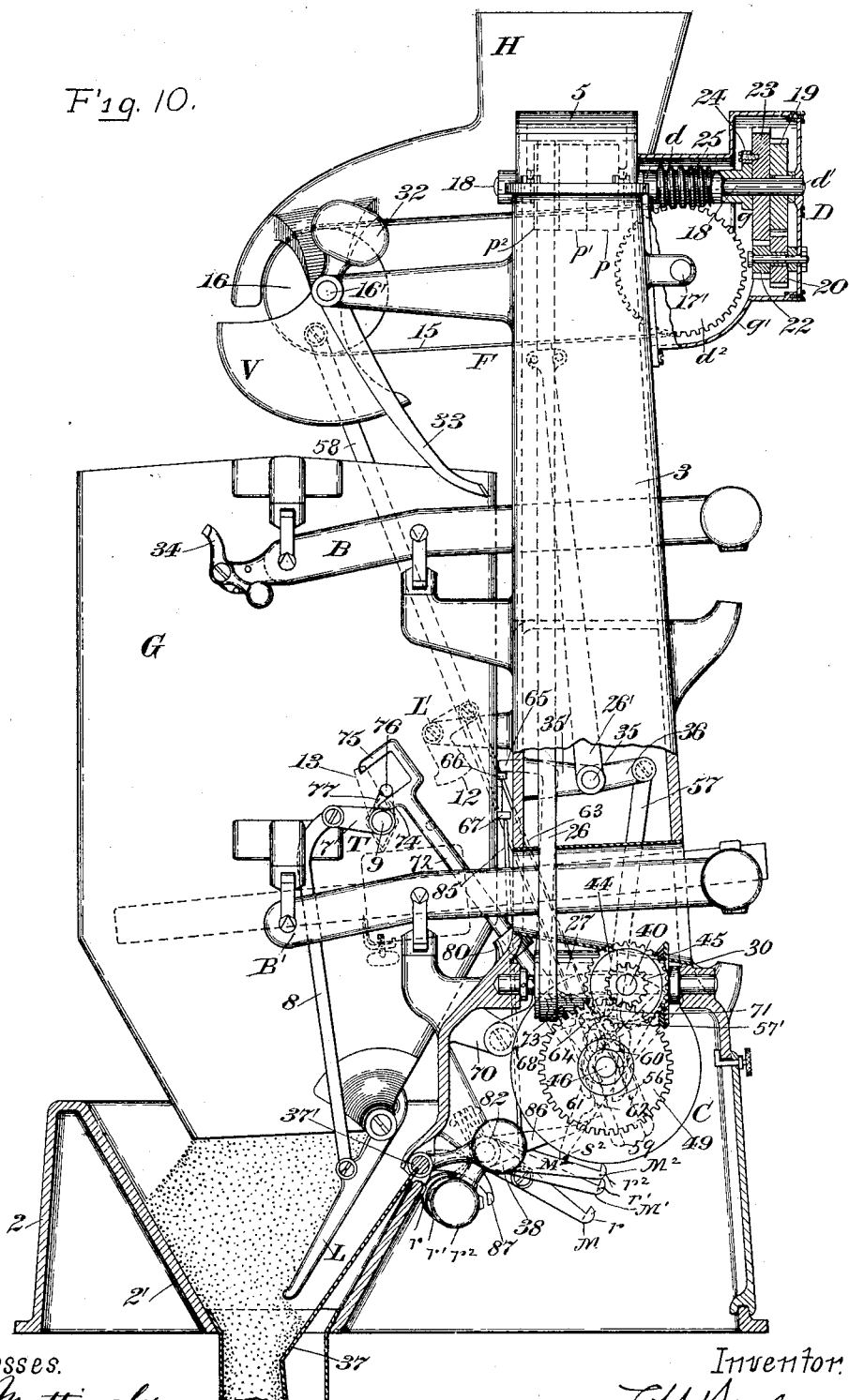
Figure 11:
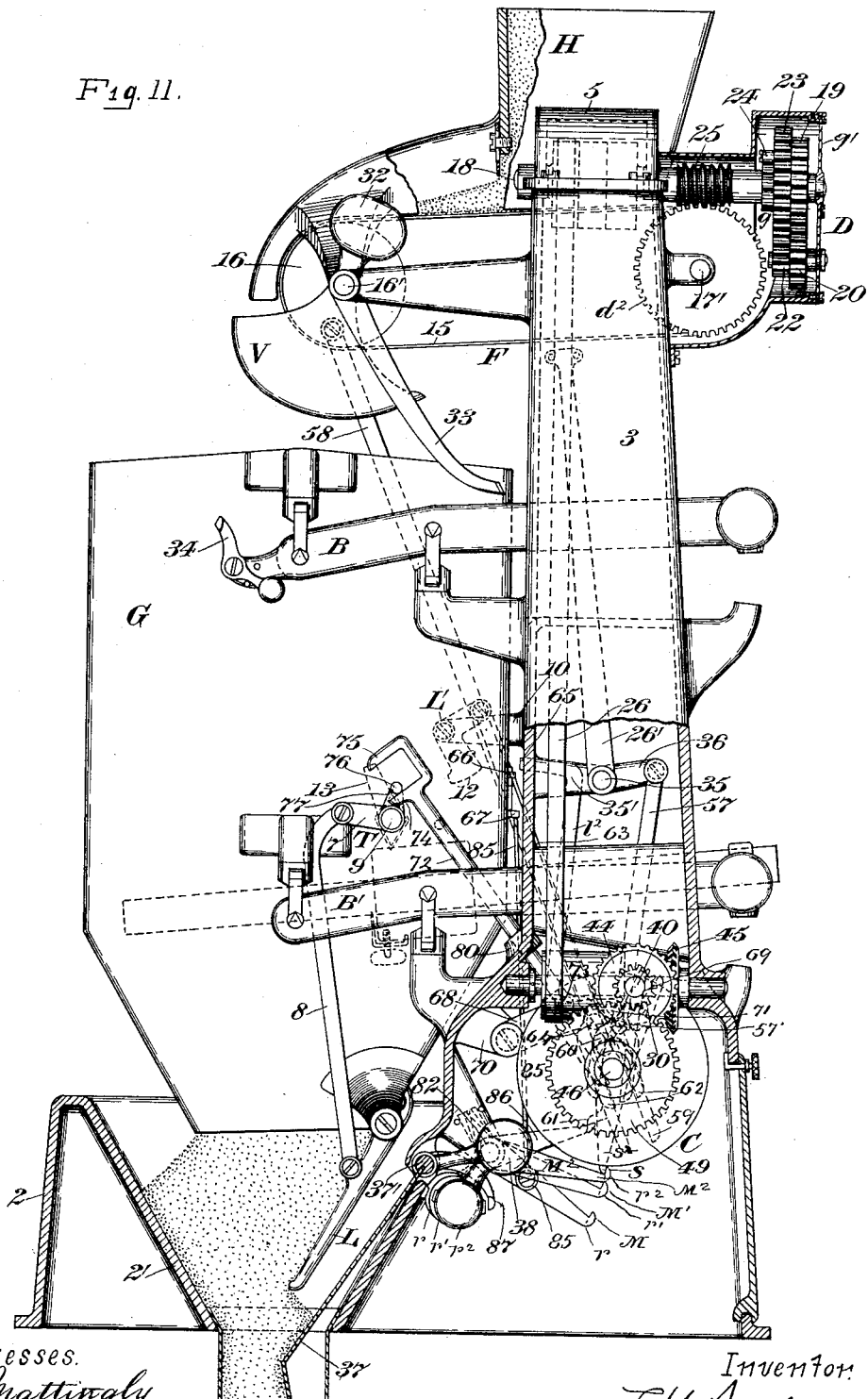

The chute 2' and the regulator-plate 37 are so constructed and are so disposed with relation to the load-receiver that when the load is discharged, as illustrated in Fig. 10, the material as it passes from said load-receiver will depress the forward free end of the plate and will hold said plate in the depressed position shown in said figure until all of the material has passed below the forward end thereof.

As a means for actuating the several submechanisms of the weighing-machine in proper sequential order and for insuring a completed operation of one submechanism before the operation of another submechanism has begun, or, in other words, for continuously locking all but the operating submechanism out of action and against movement, I have provided, in operative connection with all of the submechanisms, a compound power-driven actuating mechanism, (designated in a general way by P, Fig. 1,) which mechanism in the preferred form thereof comprises a primary actuating device, a secondary actuating device, and a driving connection between said actuating devices.

The primary actuating device or driver mechanism in the form thereof shown (see Figs. 1, 2, and 4 of the drawings) comprises a horizontally-disposed power-shaft 40, journaled in a bearing on the side frame 3 and having at one end thereof a driving-pulley 41 and a loose pulley 42, which may be rotated by a belt 43 from any suitable source of power. (Not shown.) This power-shaft 40 has at its inner end a bevel-gear 44, which meshes with the bevel-gear 45, fixed to the shaft of the drum 27, around which extends the belt 26, that drives the material-feeding mechanism.

The secondary actuator or driving device comprises a driven shaft or cam-shaft 46, a series of submechanism-interlocking actuators, (herein shown as five in number and designated in a general way by C, C', $C^2$, $C^3$, and $C^4$, respectively,) each of which is in operative connection with and is adapted for controlling the action of a submechanism of the weighing-machine.

The driving connection between the primary actuator and the secondary actuator comprises, in the form shown most clearly in Fig. 1 of the drawings, two opposing friction-disks 47 and 48, fixed to the cam-shaft 46 near one end thereof, a driven gear 49, rotatably mounted upon said cam-shaft between the working faces of the friction-disks 47 and 48, and a driving-gear 30, fixed to the power-shaft 40 of the primary actuator and meshing with the driven gear 49.

It is distinctly to be understood that I do not limit myself to the specific construction and organization of driving connection between the primary and secondary actuators, as hereinbefore described, as these may be variously modified and still be within the purview of this invention, and any suitable connection may be employed which will permit interrupted rotary movements of the secondary actuator.

Each submechanism-actuator is shown in the nature of a cam having an eccentric portion and a concentric portion, which portions are termed the "submechanism-actuating" portions and "submechanism-locking" portions, respectively, the actuating portion of each cam being constructed to impart the requisite movements to the member to be operated by said cam.

The actuating portions 52, 52' $52^2$, $52^3$, and $52^4$ and locking portions 53, 53', $53^2$, $53^3$, and $53^4$ of each cam, which are, as before stated, eccentric and concentric, respectively, to the axis of rotation, are preferably formed by cam-grooves 54, 54', $54^2$, $54^3$, and $54^4$ in the side faces of the disks, as will be understood by reference to Figs. 29 to 38, inclusive, of the drawings.

In the construction and organization thereof illustrated the cam C (termed the "belt-shipper" cam) is connected with the belt-shipper rock-shaft 35 and is intended to control the operations of the material-feeder. The cam C' (termed the "valve-cam") is operatively connected with the stream-controller or valve V and is intended to actuate and control the movements of said valve. The cam $C^2$ (termed the "closer-latch" cam) is operatively connected with and is intended to actuate the closer-latch. The cam $C^3$ (termed the "receiver-locking" cam) has in connection therewith a receiver-latch $l^2$ and is intended to operate said latch to shift the same into and out of engagement with a projection on the receiver to lock said receiver in various positions, and the cam $C^4$ (termed the "closer-actuating" cam) is in operative connection with a device for actuating the closer-sustaining toggle and is intended positively to impart opening and shutting movements to the said closer. These cams C, C', $C^2$, $C^3$, and $C^4$ are mounted upon the cam-shaft 46, with their actuating portions 52, $52'$, $52^2$, $52^3$, and $52^4$ so disposed relatively to one another that they will be effective for operating their respective submechanisms in proper sequential order, certain of said cams having the portions 53 $53'$, &c., in position for locking their respective submechanisms against movement when the actuating portions 52 $52'$, &c., of other cams are in position for effecting a movement of other submechanisms, as will be readily understood by a comparison of Figs 29 to 33, inclusive, of the drawings, which illustrate the relative positions of the several cams during the supply of a load to the load-receiver, or when the parts of the weighing-machine are in the positions shown in Fig. 5 of the drawings.

The actuating-connector between the belt-shipper shaft 35 and the cam C comprises in the preferred form thereof a rod or thrust member 57, pivotally connected at its upper end to the outer end of the crank-arm 36, fixed to the rock-shaft 35, and bifurcated at 56 at its lower end to straddle the shaft 46, whereby the same is guided in its reciprocatory movements, and also having near the bifurcated end thereof a roller $57'$, which is supported between the opposing walls of the groove 54 of said cam.

The actuating-connector between the valve V and valve-cam $C'$ is shown as a connecting-rod 58, pivotally secured at its upper end to a side plate of the valve V, bifurcated at its lower end, as at 59, to straddle the cam-shaft 46, and having a roller 60, which is seated in the groove $54'$ of the cam $C'$. The actuating-connector between the valve-cam and valve also is shown having at the lower end thereof a latch-tripping projection 61, the function of which will be hereinafter described.

The actuating-connector between the closer-latch $L'$ and closer-latch cam $C^2$ is shown as a rod 63, bifurcated at its lower end 62 to straddle the cam-shaft and having a roller 64 adjacent to said bifurcated end, which is supported between the walls of the groove $54^2$ of said cam. (See Figs. 2 and 31.)

The receiver-latch $l^2$, in connection with receiver-locking cam $C^3$, is shown as a vertically-disposed bar having a rectangular projection 65 at the upper end thereof in position to engage the upper and lower faces alternately of the stop-abutment 66, fixed to the rear wall of the load-receiver, and said bar has at the lower end thereof two oppositely-disposed arms 68 and 69, the former of which is pivotally supported upon a bracket 70 on the framework and the other arm 69 of which has at the outer end thereof a roller 71, (see Figs. 2 and 32,) which is supported between the opposing walls of the groove $54^3$ of said cam $C^3$.

The actuating-connector between the closer-actuating cam $C^4$ and closer-sustaining toggle T is shown as a bar 72, bifurcated at its lower end to straddle the cam-shaft 46 and having a roller 73 adjacent to said bifurcated portion, which is supported between the opposing walls of the groove $54^4$ of said cam, and said rod also has at the upper end thereof two projections 74 and 75, between which is seated a pin or stud 76 of the crank-arm 77, fixed to the rock-shaft 9, to which the closer-sustaining toggle is secured, the projection 74 being adapted on the advancing movement of the actuating-connector 72 for engaging the projecting portion 76 of the crank-arm 77, to thereby impart a closer-opening movement to the closer-sustaining toggle by shifting the same beyond its dead-center, and the projection 75 being adapted on the retractive movement of said actuating-connector for engaging said projection 76 and imparting a closer-shutting movement to said closer-sustaining toggle.

The actuating-connector between the closer-cam $C^4$ and closer-sustaining toggle is shown supported for reciprocatory movements in a guideway or bearing 80, formed in the front wall of the side frame 3.

As a means for stopping the secondary actuator at successive predetermined points in each rotation and for governing the intermittent movements of said actuator by the submechanisms of the weighing-machine I have provided, in connection with the cam-shaft 46 of the secondary actuator, movement interrupting or limiting mechanism. (Shown in the accompanying drawings comprising a series of independently-effective so-called "movement-limiters," preferably three in number, and designated in a general way by M, $M'$, and $M^2$, respectively, and each comprising a stop-arm fixed to the cam-shaft and a counterweighted latch pivotally supported at one side of the axis of rotation of the stop-arm and having a catch at the outer non-counterweighted end thereof, which is disposed normally in the path of movement of the outer end of said stop-arm.)

The stop-arms of the movement-limiters (designated by $s$, $s'$, and $s^2$) are fixed to the cam-shaft at different points in the length thereof and in different positions radially thereof, and the latches for engaging said stop-arms (designated by $r$, $r'$, and $r^2$) are pivotally supported in operative relation with the several stop-arms upon a common pivot or rock-shaft 82, journaled at opposite ends in suitable bearings on the base of the framework.

The stop-arm $s$ of the movement-limiter M is so disposed with relation to the actuating portions of the belt-shipper cam C and valve-actuating cam $C'$ that when said stop-arm is engaged by the latch $r$ of said movement-limiter the belt-shipper will be held in a position for retaining the belt 26 upon the high-speed pulley $p$ of the force-feed-actuating mechanism (see Fig. 5) and the stream-controller or valve V will be held in its wide-open position, where it will remain until sufficient material has been supplied to the load-receiver to carry the same below the poising-line.

When the load-receiver descends below the poising-line, the projection 67 on said receiver will strike a vertically-disposed latch-actuator 85, which is pivotally connected at its lower end to the latch $r$ of the movement-limiter M, thus shifting said latch out of engagement with the stop-arm of this movement-limiter and allowing the cam-shaft 46 to rotate a short distance, or a distance sufficient to permit the belt-shipper cam to throw the belt 26, through the medium of the belt-shipper, to the low-speed pulley $p'$, during which movement the supply-valve V gravitates to the drip position, (shown in Fig. 6,) with its by-pass arm 33 in engagement with the by-pass 34, which interrupts further closing movement of the valve.

The stop-arm $s'$ of the movement-limiter M' is so disposed that concurrently with the shifting of the belt 26 to the low-speed pulley said stop-arm will engage the latch of said movement-limiter and will again stop the rotation of the cam-shaft 46, which remains at rest until the by-pass on the further descent of the load-receiver releases the by-pass arm of the supply-valve and permits said valve completely to close. During this final closing movement of the supply-valve the belt-shipper cam C operates to shift the belt 26, through the medium of the belt-shipper 26', to the loose pulley $p^2$, and the valve-cam C' simultaneously comes to a valve-locking position.

On the descending movement of the actuating-connector 58 between the gravity-closing valve-cam, C' and valve V the latch-actuating projection 61 of said connector 58 strikes a crank-arm 86, fixed to the rock-shaft or pivot 82, to which the latch of the movement-limiter M' is secured, and thereby throws the latch $r'$ of this movement-limiter out of engagement with the stop-arm $s'$, this action of said limiter thus permitting a further movement of the cam-shaft 46, which continues to rotate until the stop-arm $s^2$ of the movement-limiter $M^2$ comes into position to be engaged by the latch $r^2$ of said movement-limiter $M^2$, this engagement not taking place until the receiver-locking cam $C^3$ has operated the latch $l^2$ to lock the receiver in its lowest position by engaging with the lug or stop 66 on said receiver, (see Fig. 9), or until the closer-actuating cam $C^4$ has operated to throw the closer-sustaining toggles from points at one side of their dead-center positions to points at the other side of said positions to permit the opening of the closer and the discharge of the load, nor until the regulator 37 has been depressed by the weight of a load to permit the latch $r^2$ of the movement-limiter $M^2$ to come into position to engage said stop-arm $s^2$ of said limiter $M^2$, the latch $r^2$ of said limiter $M^2$ being normally held out of the path of movement of its coöperative stop-arm by a curved abutment-arm 87, fixed to the rock-shaft 37' of the regulator 37, which abutment engages the counterweight of the limiter $M^2$ and governs the stop-engaging movement of the latch $r^2$ of said limiter, as will be readily understood by a comparison of Figs. 5 and 10 of the drawings.

After the latch $r^2$ of the movement-limiter $M^2$ has been shifted into a position to engage the stop-arm $s^2$ of said movement-limiter the cam-shaft 46 will be held at rest by said stop-arm $s^2$ and latch $r^2$ until the entire load has passed below the regulator and the regulator has ascended to the normal position thereof, (shown in Fig. 5,) which will cause the stop-abutment 87 to throw the latch $r^2$ of said movement-limiter $M^2$ out of engagement with its stop-arm $s^2$ and permit a further movement of said cam-shaft, and during this further movement the receiver-locking cam $C^3$ will withdraw latch $l^2$ from contact with the upper side of abutment 66, thus permitting the bucket to rise, and will then return said latch $l^2$ beneath said abutment to sustain said load-receiver and prevent its downward movement while the closer is being positively shut; the closer-actuating cam $C^4$ will, through the connections described, shut the closer L'; the receiver-locking cam $C^3$ will again withdraw latch $l^2$ to permit the load-receiver to descend under the influence of its load; the closer-latch cam $C^2$ will actuate the latch L', and thereby lock the toggles T T' against accidental release; the valve-actuating cam C' will positively open the valve V, and about simultaneously with the action of said cam C' the belt-shipper cam C will cause the belt to be thrown from the loose pulley $p^2$ to the high-speed pulley $p$, and material will again be rapidly fed to the load-receiver, as shown in Fig. 5, these operations occurring and recurring in proper sequence while the machine is in use.

The valve-actuating cam C' has, in addition to its locking and actuating portions 52' and 53', respectively, a quick let-off portion $52^2$, disposed substantially radial to the axis of said cam C' and which is adapted to be brought substantially into alinement with the line of movement of the actuating-connector 58 between said cam and the supply-valve, this let-off portion being conjugate to the rear end of the locking portion 53' of said cam, and when the cam is in the position illustrated in Figs. 18 and 35 allowing said actuating-connector to gravitate and inaugurate the closing movement of the valve, said cam being moved to what may be termed its "let-off" position, immediately succeeding the shifting of the belt 26 from the high-speed to the low-speed pulley by the belt-shipper cam C.

Figure 9:
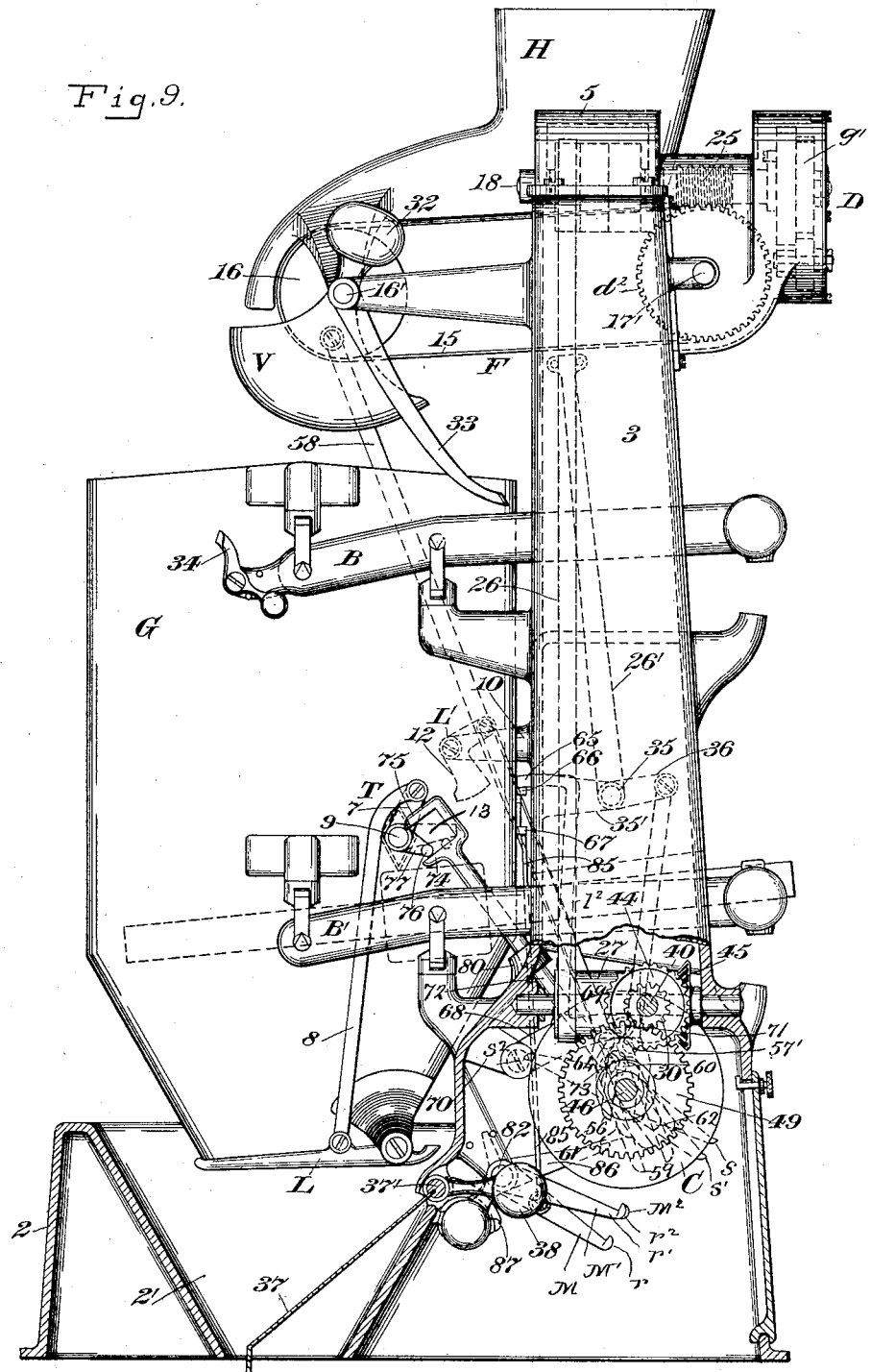
Figure 12:
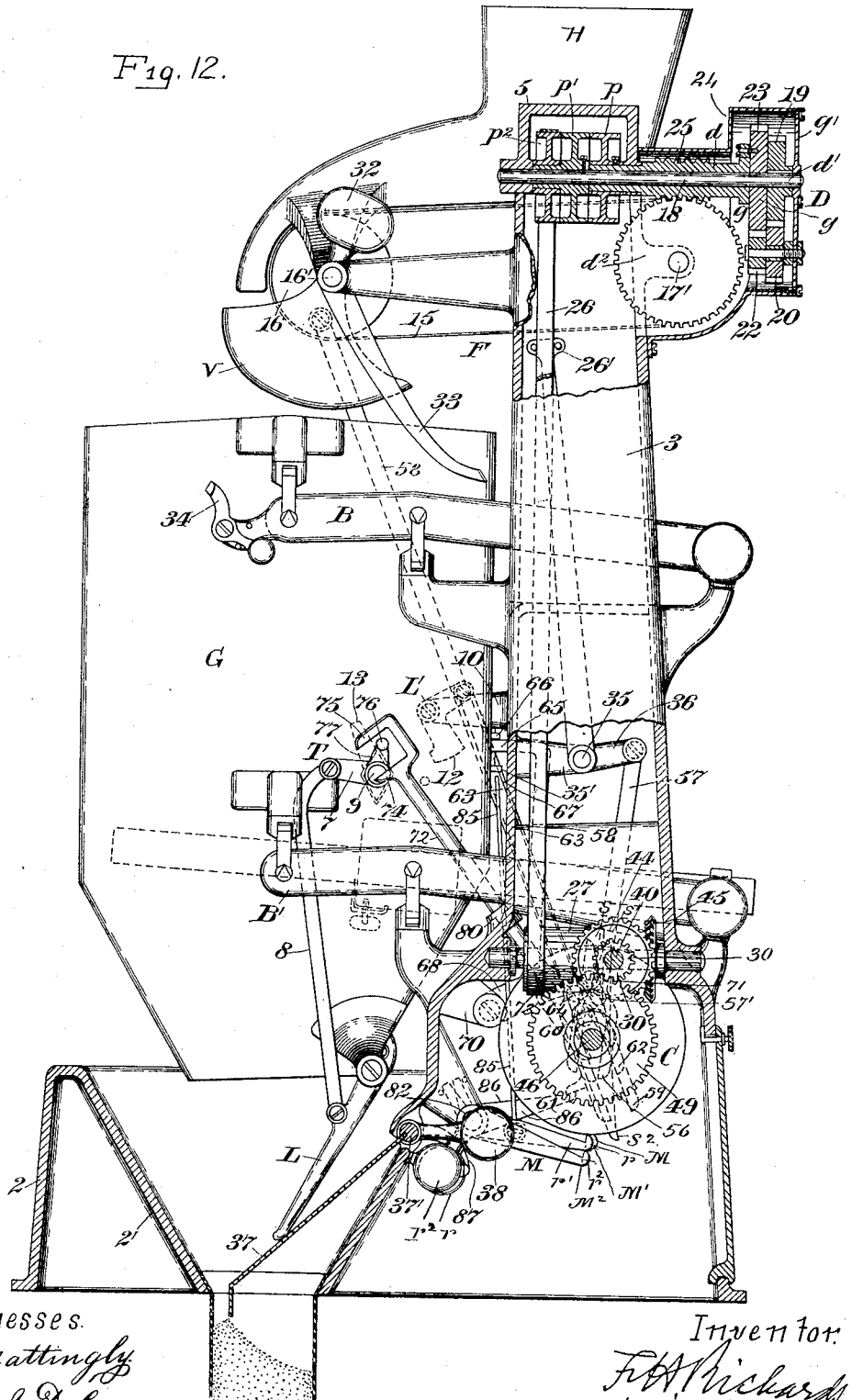
Figure 13:
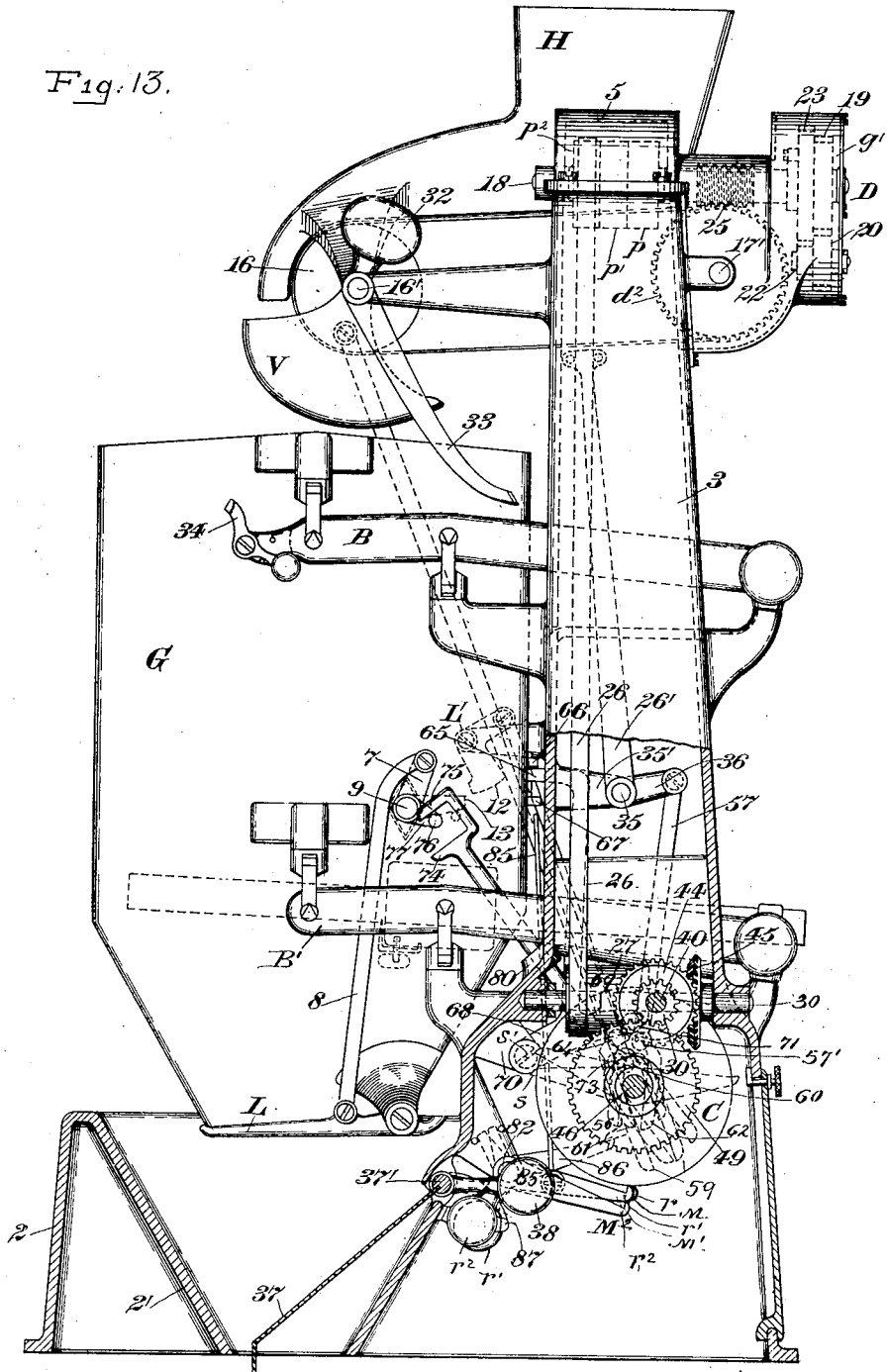
Figure 14:
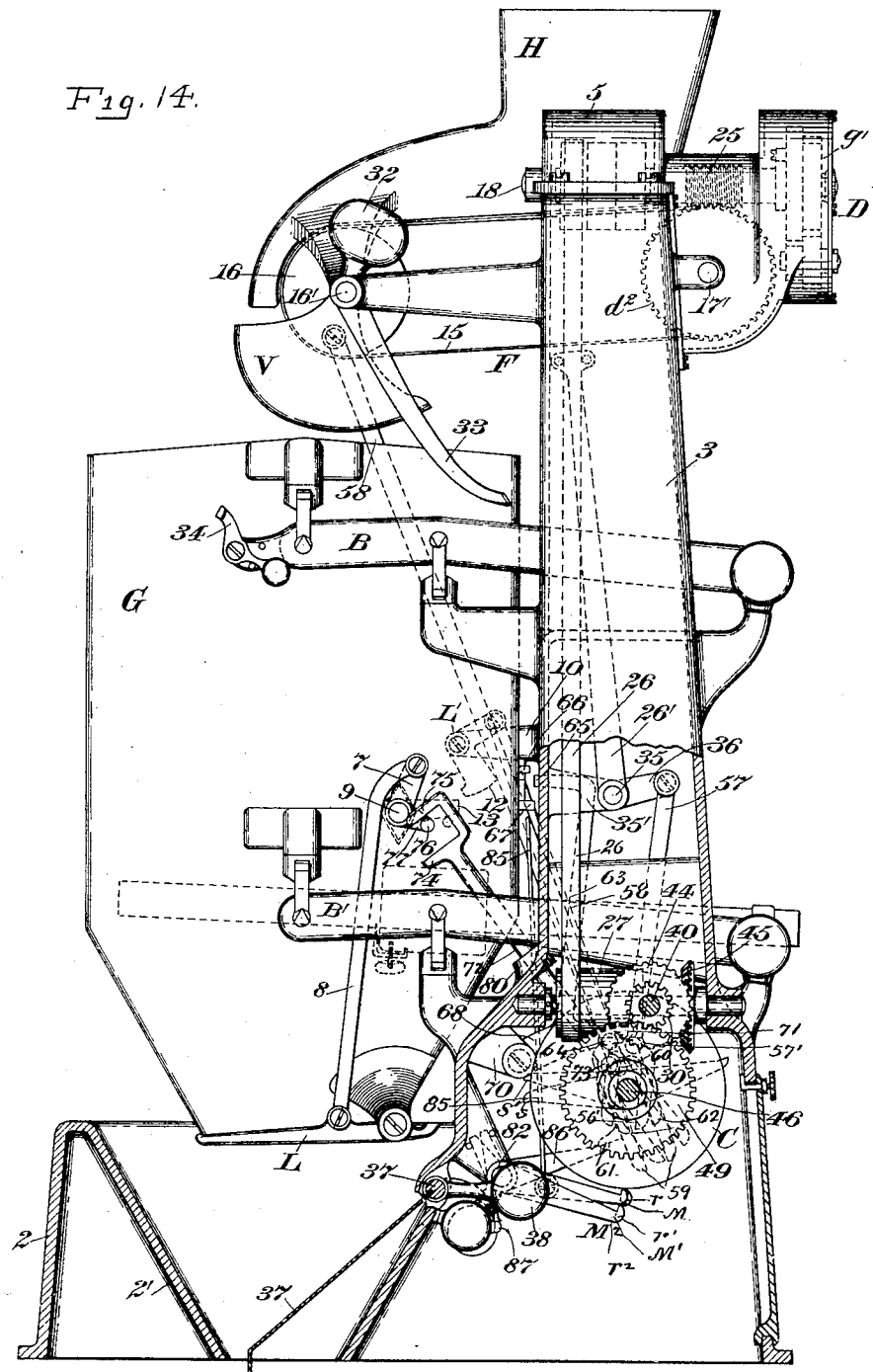
Figure 15:
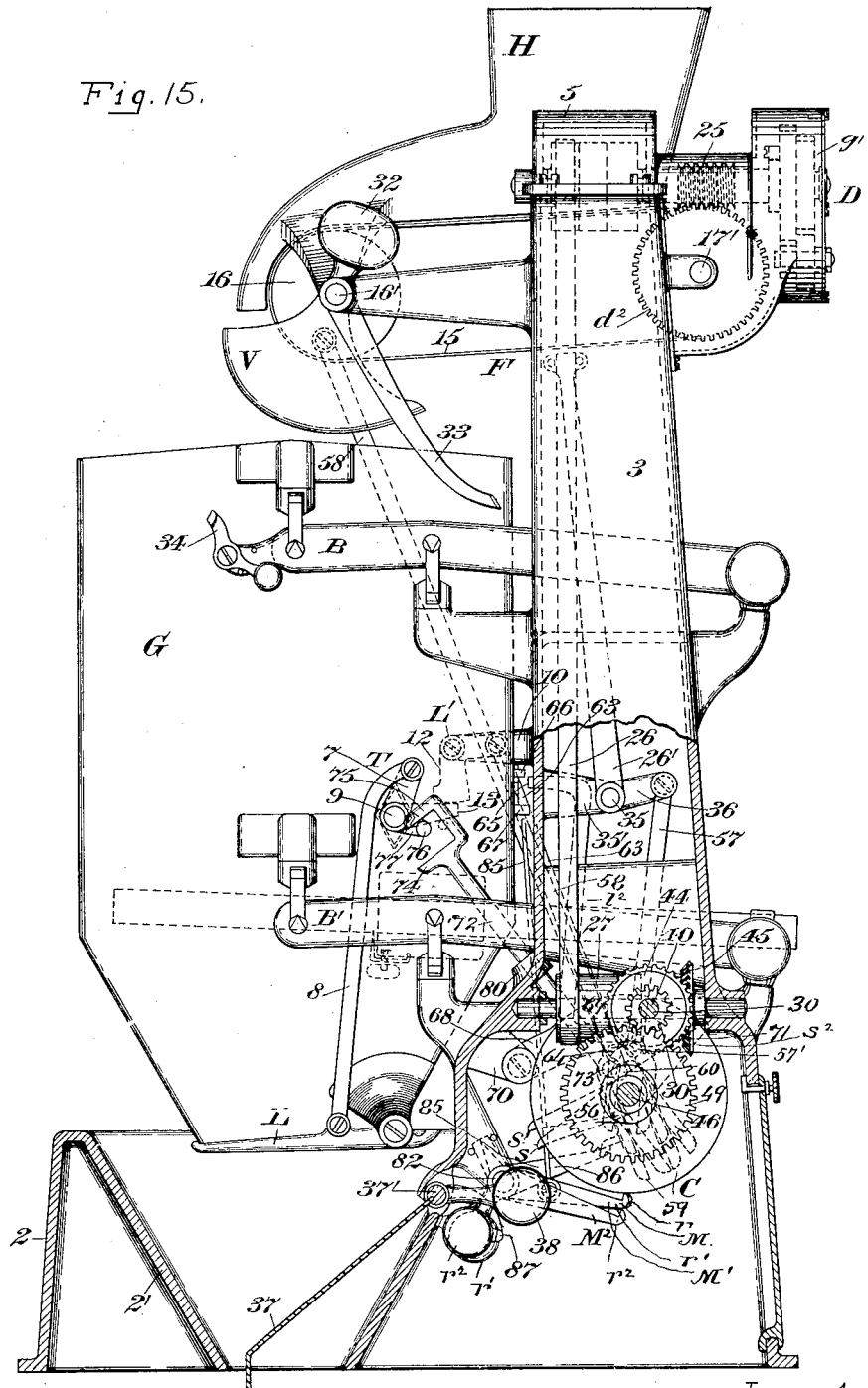

The load-receiver latch $l^2$ is actuated at the proper times by the cam $C^3$ into and out of engagement with the stop 66 on said load-receiver. In this connection it is to be remembered that the closer L is not provided with a counterweight for returning it, and consequently instrumentalities must be provided positively to shut said closer, the means shown for accomplishing this result being the rod 72, which is actuated by the cam $C^4$. When this rod is actuated to cause its projection 75 to engage the crank-arm 77, and thereby through the intermediate connections shut the closer, it will exert a downward pull upon the load-receiver, and this action is resisted by the projection 65 of the receiver-latch, which is at this time thrown under and is in contact with the stop 66, as shown in Figs. 12 and 13. When the rod 72 is actuated by said cam $C^4$ to cause its projection 74 to engage the crank-arm 77 to release the closer L, an upward thrust is imparted to the load-receiver, and this action is resisted by said projection 65 of the receiver-latch $l^2$, which is then thrown by the cam $C^4$ above the stop 66, as shown in Figs. 9 and 10.

Figure 8:
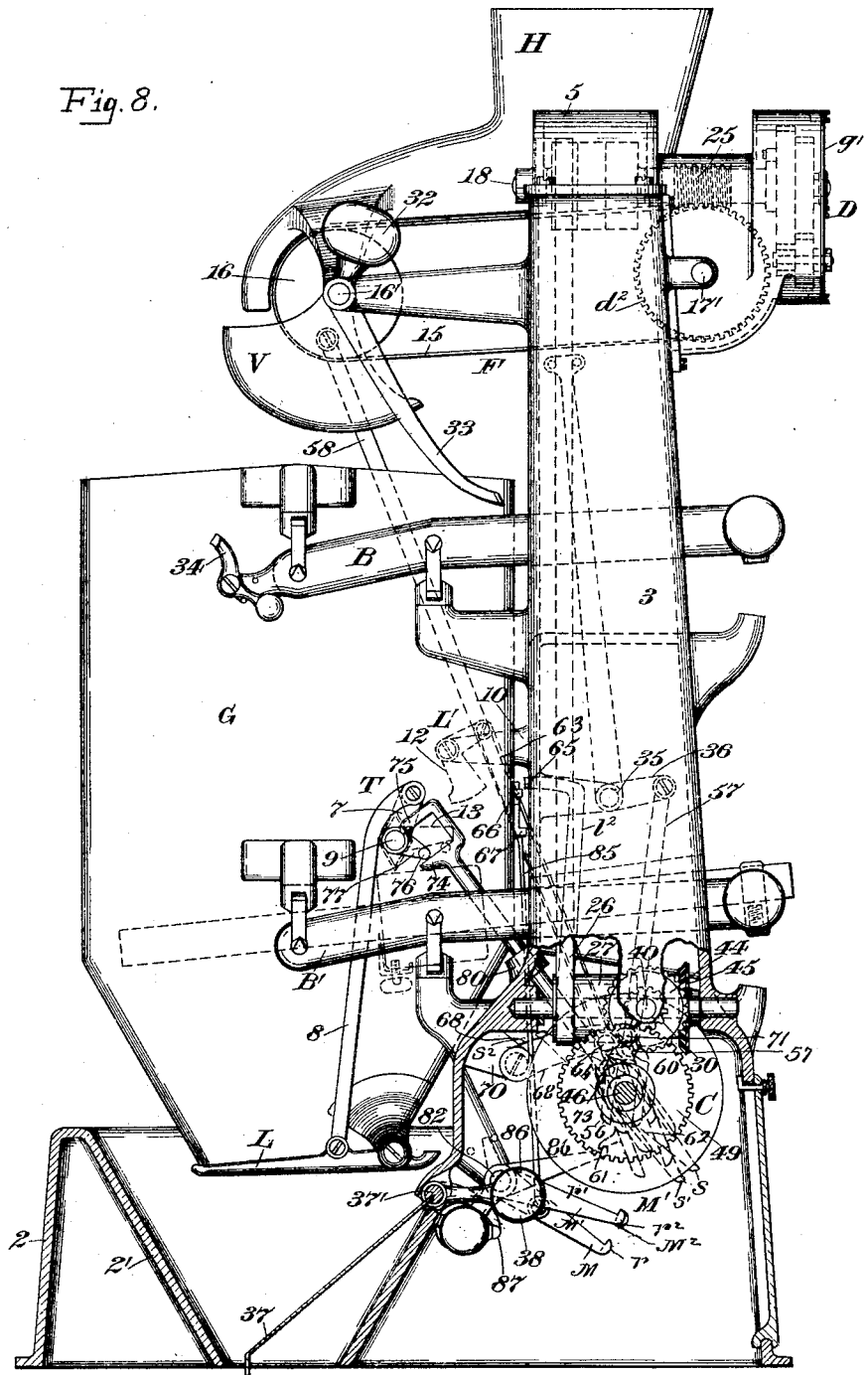

Briefly stated, the operation of my improved weighing-machine is as follows: Assuming the several submechanisms and various elements of the weighing-machine to be in the positions illustrated in Fig. 5, the supply-valve being in its wide-open position and the belt 26, through which motion is communicated to the driving mechanism of the force-feeder, being on the high-speed pulley $p$ and the cam-shaft being held as against rotative movement by the movement-limiter M, the load-receiver after a quantity of material is supplied thereto sufficient to overcome the resistance of the counterweighted beams descends and releases the latch $r$ of the movement-limiter M from the coöperating stop-arms $s$ of the cam-shaft 46, thus permitting said shaft to rotate sufficiently to carry the closer-actuating cam $C^4$ from the position shown in dotted lines in Fig. 17 to the let-off position thereof shown in full lines in Fig. 18, simultaneously advancing the belt-shipper cam C from the position shown in full lines in Fig. 17 to that shown in full lines in Fig. 19. This allows the supply-valve to gravitate to its drip position and causes the belt 26 to be shifted to the low-speed pulley $p'$, as illustrated in Fig. 6 of the drawings, the supply-valve being arrested at the drip position by the by-pass arm 33 engaging the by-pass 34 on the end of the scale-beam B. Immediately upon the arrival of the cams $C'$ and C to the positions thereof illustrated in Figs. 17 and 18, respectively, the stop-arm $s'$ of the movement-limiter $M'$ is engaged by the latch $r'$ of said movement-limiter, which stops the rotation of the cam-shaft. After sufficient material has been delivered to the load-receiver to carry the same below the poising-line, which simultaneously releases the by-pass from the by-pass arm on the valve, said valve will gravitate to the fully-closed position, (illustrated in Fig. 7,) and the latch-releasing arm 61 on the actuating-connector 58, between the cam $C'$ and valve V, will release the movement-limiter $M'$ and permit the cam-shaft to continue its advancing movement, the belt 26 being at this time shifted to the loose pulley $p^2$, the several cams of the secondary actuator being at this time in the positions shown in full and dotted lines in Fig. 19 and the valve-actuating cam and belt-shipper cam being in positions for blocking the opening and feeding movements, respectively, of the valve and feeder. After the load-receiver has arrived at its lowest position, as shown in Fig. 8, the closer-latch $L'$, which blocks the opening movement of the closer, will be shifted by the closer-latch-actuating cam $C^2$ and its actuating connector out of engagement with the closer-sustaining toggle, leaving the closer-toggle free to be operated by its actuator, the several cams of the secondary actuator being at this time in the position shown in full and dotted lines in Fig. 20. Immediately after the release of the closer-latch, as described, the receiver-latch $l^2$ will on the continued operation of the secondary actuator be shifted by the cam $C^3$ into engagement with the upper face of the stop-abutment 66 on the receiver to thereby hold said receiver against ascending movement, as shown in Fig. 9, the several cams of the actuator being at this time in the positions illustrated in full and dotted lines in Fig. 21. Immediately succeeding the locking of the receiver in its lowest position the closer-actuating cam $C^4$ will have advanced sufficiently to cause the actuating-connector to throw the closer-sustaining toggle from over and beyond the dead-center position shown in Fig. 9 to the position shown in Fig. 10, thus allowing the closer to open and permit the discharge of the load from the load-receiver, the several cams of the secondary actuator being at this time in the position thereof shown in full and dotted lines in Fig. 22. As the load is discharged from the load-receiver onto the regulator-plate by the opening of the closer, as shown in Fig. 10, said regulator-plate will descend, thereby shifting the stop-abutment 87 in connection therewith out of engagement with the latch $r^2$ of the movement-limiter $M^2$, which latch immediately advances to the position shown in Fig. 10 and into position for engaging the stop-arm $s^2$ of said limiter, which stop-arm on the continued advancing movement of the cam-shaft engages said latch $r^2$ and stops the rotation of the secondary actuator until the load descends below the forward end of the regulator-plate 37, the receiver-latch $l^2$ also being shifted out of engagement with the stop-abutment 66 on the load-receiver by its actuating-cam immediately succeeding the opening of the closer and the discharge of the load, the cam or cams of the secondary actuator being at this time in the positions thereof shown in full and dotted lines in Fig. 23 and all the other parts of the machine being in the positions shown in Fig. 11. On the release of the receiver-latch $l^2$ the receiver returns to its normal elevated receiving position, and immediately on the return of the regulator 37 to its elevated position, which releases the movement-limiter $M^2$ and starts the cam-shaft, the receiver-latch l² is again shifted into engagement with the under face of the stop-abutment 66 to lock the receiver against movement in its elevated position, as shown in Fig. 12, all of the cams of the secondary actuator being at this time in the positions shown in full and dotted lines in Fig. 24. After the receiver is locked in its elevated position the continued advancing movement of the cam-shaft carries the closer-actuating cam C⁴ to the position for effecting a closing movement of the closer through the medium of the actuating-connector 72 between said cam and closer-sustaining toggle T, as shown in Fig. 13, all of the cams of the secondary actuator being at this time in the positions shown in full and dotted lines in Fig. 25. Immediately succeeding the shutting of the closer the receiver-latch is again thrown out of engagement with the stop-abutment on the receiver by the cam C³, leaving said receiver free to reciprocate, as will be understood by a comparison of Figs. 14 and 26, after which the closer-actuating cam C² will be brought into an operative position for shifting the closer-latch L' into position for blocking the closer-sustaining toggle against closer-opening movement, as will be understood by a comparison of Figs. 15 and 27. Immediately succeeding the locking of the closer in its shut position the valve-actuating cam C' will be brought into its operative position for imparting an opening movement to the valve, the closer-cam being at this time in position for locking the closer against accidental movement, as will be understood by a comparison of Figs. 16 and 28 of the drawings, and immediately succeeding the complete opening of the valve the belt-shipper cam will again have advanced to the position for shifting the belt 26 from the loose pulley to the high-speed pulley, as illustrated in Fig. 5, such suboperations being successively repeated during successive complete weighing operations of the machine.

Having described my invention, I claim—

1. In a machine of the class specified, the combination, with feeding, weighing, and discharging mechanisms, of a power-driven shaft; means carried by said shaft in operative connection with and controlling the operations of the feeding and discharging mechanisms; means also carried by said shaft for controlling the action of the weighing mechanism while the load is being discharged; and means for intermittingly stopping and releasing said shaft.

2. In a machine of the class specified, the combination, with feeding, weighing, and discharging mechanism, of a power-driven shaft; a series of cams having active and locking portions carried by said shaft, said cams being in operative connection with each of, and controlling, the sequential operations of said feeding and discharging mechanisms; a cam carried by said shaft; means connected with said cam for blocking the weighing mechanism at intervals; and means for intermittingly operating the shaft.

3. In a weighing-machine, the combination, with a series of submechanisms including power-driven feeding mechanism and weighing and load-discharging devices, of actuating mechanism including a cam-shaft; cams on said shaft in operative connection one with each submechanism; and devices for stopping and releasing said shaft intermittingly in the complete rotation thereof.

4. In a machine of the class specified, the combination, with weighing mechanism involving a load-receiver having a closer, of means for supplying material to said load-receiver; a valve; a power-driven shaft; means carried by said shaft for opening the valve and for opening and shutting the closer and for locking one of said parts relatively to the other at certain periods in the operation of the machine; a device for blocking the movement of the weighing mechanism; and means carried by the shaft for actuating said device.

5. In a machine of the class specified, the combination, with feeding, weighing, and load-discharging mechanisms, of a series of cams for controlling the operation of said feeding, weighing, and discharging mechanisms, and means for intermittingly stopping and releasing said cams.

6. In a machine of the class specified, the combination, with feeding, weighing, and load-discharging mechanisms, of a power-driven shaft; a series of cams carried by said shaft and operatively connected with said mechanisms; and means for intermittingly stopping and releasing said shaft.

7. In a machine of the class specified, the combination, with feeding, weighing, and load-discharging mechanisms, of a series of cams, each cam having an active and a locking portion, operatively connected with said mechanisms; and means for intermittingly stopping and releasing said cams.

8. In a machine of the class specified, the combination, with feeding, weighing, and load-discharging mechanisms, of a power-driven shaft; means carried by said shaft for controlling the operation of said feeding mechanism, and for blocking the weighing mechanism; and means also carried by said shaft for positively operating the load-discharging mechanism, to the positions necessary to deliver the load and sustain the same.

9. In a machine of the class specified, the combination, with feeding, weighing, and load-discharging mechanisms, of a power-driven cam-shaft; a lever controlled by a cam on said shaft, for locking the weighing mechanism against movement at certain times; and cams each having a locking and an active portion also carried by said shaft for controlling the operations of the feeding and discharging mechanisms.

10. In a machine of the class specified, the combination, with power-actuated supply mechanism, of a load-receiver; a pivoted closer for said load-receiver; means for positively opening and shutting said closer; and means involving a series of cams for controlling the operation of the supply mechanism and for blocking the movement of the load-receiver during the opening and shutting movements of the closer.

11. In a machine of the class specified, the combination, with power-actuated supply mechanism, of a valve; a load-receiver having a closer; a shaft; and cams each having an active and a locking portion carried by said shaft for controlling the operations of the supply mechanism, the valve, the load-receiver, and the closer.

12. In a machine of the class specified, the combination, with supply mechanism including a valve, of a load-receiver having a closer; means for positively opening and shutting said closer; means for blocking the movement of the load-receiver while the closer is being opened and shut; means for controlling the operation of the valve; and means for actuating the power-driven feed mechanism at different speeds during a single weighing operation of the machine.

13. In a machine of the class specified, the combination, with power-driven supply mechanism, of a valve for controlling the passage of material from said supply mechanism; means permitting said valve to gravitate to its drip and closed positions and for locking it against movement; a load-receiver; a closer therefor; means for positively actuating said closer to open and shut the same; and means for blocking the movement of the load-receiver while said closer is being actuated.

14. In a machine of the class specified, the combination, with supply mechanism, of a valve for regulating the quantity of material delivered by said mechanism; means for positively actuating said valve to open the same and for locking said valve while in its closed position; a load-receiver; a closer therefor; a "dead-lock" toggle for locking said closer in its shut position; means coöperative with said toggle for positively opening and shutting said closer; a latch for preventing accidental movement of the closer; and means for actuating said latch.

15. In a machine of the class specified, the combination, with supply mechanism involving a gravity-closing valve, of a power-driven shaft; connections between said valve and shaft whereby the valve is positively opened; a load-receiver involving a closer; an actuator for positively opening and shutting said closer; stop-arms carried by said shaft; and latches coöperating with said stop-arms.

16. In a machine of the class specified, the combination, with power-driven feeding mechanism, of a gravity-closing valve for regulating the supply of material delivered from said feeding mechanism; a power-driven shaft; a cam carried by said shaft; a connector between said cam and valve and serving positively to open the valve; a load-receiver; a closer carried by said load-receiver; a cam carried by said shaft for positively opening and shutting said closer; and means for intermittingly stopping and starting said shaft.

17. In a machine of the class specified, the combination, with means for supplying material, of a load-receiver; beam mechanism on which said load-receiver is supported; a closer pivoted to said load-receiver; a dead-lock toggle connected with said closer; a cam having active and locking portions; a connector between said cam and said toggle; and means for actuating said cam and thereby causing the connector positively to open and shut the closer.

18. In a machine of the class specified, the combination, with feeding mechanism, of a load-receiver; beam mechanism for supporting the same; a closer pivoted to said load-receiver; a dead-lock toggle for locking said closer in its shut position; a power-driven actuator; and a rod having projections for positively opening and shutting the closer operated by said actuator.

19. In a machine of the class specified, the combination, with weighing mechanism, of a power-driven feed-belt; means for actuating said belt at different speeds; a cam having active and locking portions; and means in connection with said cam for controlling the operation of said feeding mechanism.

20. In a machine of the class specified, the combination, with weighing mechanism, of means for supplying material thereto; a self-closing valve for regulating the supply of such material; an intermittingly-operated shaft; means for starting and stopping said shaft; a cam having active and locking portions carried by said shaft; and means connecting said cam with the valve.

21. In a machine of the class specified, the combination, with weighing mechanism involving a load-receiver, of means for supplying material to said load-receiver; a pivoted gravity-closing valve for controlling the supply of such material; a shaft; a cam having active and locking portions carried by said shaft; a rod connecting said cam with the valve; and means including a stop-arm on the shaft and a latch on the frame for intermittingly stopping and releasing said shaft.

22. In a machine of the class specified, the combination, with feeding, weighing, and load-discharging mechanisms, of a power-driven shaft; a series of devices for intermittingly stopping said shaft; means for starting said shaft after a stopping device has been withdrawn; and means carried by said shaft for controlling the operation of the feeding, weighing, and load-discharging devices.

23. In a machine of the class specified, the combination, with feeding, weighing, and discharging mechanisms, of a shaft; a series of cams carried by said shaft and each having a locking and an active portion; devices connecting said cams with the feeding, weighing, and discharging mechanisms, said cams operating to lock said devices against action at the proper times; means for intermittingly stopping said shaft; and means for starting said shaft after the stopping means has been withdrawn.

24. In a weighing-machine, the combination, with weighing mechanism, of power-operated supply mechanism including a gravity-closing stream-controller; actuating mechanism for positively opening said stream-controller including a rotary member; and independent mechanisms for stopping and releasing said rotary member one or more times in each rotation thereof, one of said independent mechanisms being controlled by the weighing mechanism.

25. In a weighing-machine, the combination, with weighing mechanism, of stream-supplying means including a stream-controller; actuating mechanism for said stream-controller including a rotary member; a regulator shiftable by the loads; and two independent mechanisms operative, respectively, with the weighing mechanism and with the regulator for stopping and releasing said rotary member.

26. In a weighing-machine, the combination, with a series of sequentially-operative submechanisms, of a power-driven shaft embodying a series of intermittingly-operative cams having operative connections with, and effective for actuating, the submechanisms in proper sequence, said cams and connections being of such construction and organization that when one of said cams is in position for effecting a movement of one submechanism one or more of the other cams will act as interlocks to prevent the operation of one or more of the other submechanisms; and a series of movement-limiters for controlling the intermittent action of said cams.

27. In a weighing-machine, the combination, with a plurality of shiftable elements, of a power-driven shaft; a series of cams fixed to said shaft; an actuating-connector between, and operatively connecting, each cam with a shiftable element, said cams having their working portions so disposed relatively to each other that during the operation of one element, through the medium of one cam, one or more of the other elements will be locked against movement; and means for releasing and stopping said cams a plurality of times in each rotation thereof equal to the number of operations to be performed by the several elements, whereby a complete weighing operation will be effective at each complete rotation of the shaft.

28. In a weighing-machine, the combination, with a series of shiftable devices, of a cam-shaft having a series of cams in operative connection with said devices, respectively, and effective for operating, and also for blocking the movements of, each device alternately and all said devices in proper sequential order; means for stopping and releasing said shaft at predetermined points in each rotation thereof; a power-driven primary actuator; and a frictional driving connection between said primary actuator and shaft.

29. In a weighing-machine, the combination, with a series of coöperative submechanisms, of a series of combined actuating and locking devices, one in operative connection with each submechanism, and each including a power-driven cam having an eccentric actuating portion and a concentric locking portion, and the actuating and locking portions of each cam being so disposed relatively to those portions of the other cams that when one cam is effective for operating one of said submechanisms the other cams will be concurrently effective for locking the other submechanisms against operation; and a series of movement-limiters for controlling the action of said cams.

30. The combination, with weighing mechanism including a reciprocatory load-receiver, of a latch for engaging and locking the load-receiver at different points in the reciprocatory movements thereof; a power-driven cam for actuating said latch; and means for intermittently stopping and starting said cam to control the operation of said latch.

31. The combination, with weighing mechanism including a load-receiver provided with a closer, of a toggle for sustaining the closer, said toggle being supported by the load-receiver; power-driven mechanism; a device operated by said mechanism for engaging one member of the toggle to actuate the same; and means for locking the weighing mechanism against movement while the toggle is being actuated.

32. The combination, with weighing mechanism including a load-receiver having a closer and with a supply apparatus including a valve, of power-driven actuating mechanism including a continuously-progressive primary actuator and an intermittently-progressive secondary actuator in operative connection with said valve and closer and having a frictional driving connection with the primary actuator; and movement-limiters in connection with the secondary actuator and controlled by the load-receiver and valve at predetermined points in their respective movements for releasing and stopping said secondary actuator.

33. The combination, with weighing mechanism including a load-receiver having a closer, of an inverted closer-sustaining toggle including a rock-shaft having a crank-arm; a closer opening and shutting actuator embodying a rotative cam having active and locking portions and a reciprocatory member operatively connecting said cam and the crank-arm of the closer-sustaining toggle; and means for stopping and starting said cam, whereby closer opening and shutting movements are imparted to said toggle at predetermined points in the operation of the weighing mechanism.

34. The combination, with weighing mechanism including a load-receiver having a closer and with stream-supplying means including a valve, of a closer-sustaining toggle in operative connection with the closer and including a rock-shaft having a crank-arm; power-driving actuating mechanism including a valve-actuating cam and a closer-toggle-actuating cam in operative connection with the valve and closer-toggle, respectively; means controlled by the load-receiver, on the descending movement thereof, for effecting a valve-closing movement of the valve-actuating cam; means for arresting the movements of the two cams at a predetermined point in the movement of the valve; means operative, subsequent to the complete closing of the valve, for effecting a closer-opening movement of the closer-toggle-actuating cam; and means for effecting closer and valve shutting movements of the cam, one in advance of the other.

35. In a weighing-machine, the combination, with a plurality of submechanisms, of a rotative secondary actuator including a series of cams in operative connection with said submechanisms, respectively, and so disposed, one relatively to the other, as to impart movements to said submechanisms in predetermined order; a plurality of movement-limiters in operative relation with the secondary actuator and effective for interrupting the movements of said actuator a plurality of times in each rotation thereof; a power-driven primary actuator; and a driving connection between said primary and secondary actuators.

36. The combination, with weighing mechanism including a load-receiver having a closer and with a supply apparatus including a valve, of a secondary actuator including a cam-shaft having a series of cams in operative connection with said closer and valve, respectively, and having their working faces so disposed relatively to each other that they will be effective for operating the closer and valve in alternating order; a plurality of movement-limiters in operative relation with the secondary actuator and including a series of stop-arms fixed to the cam-shaft at relatively different angles; a series of latches controlled by elements of the weighing-machine and adapted for engaging and releasing the stop-arms; and a power-driven primary actuator in frictional driving connection with the secondary actuator.

37. In a machine of the class specified, the combination, with a load-receiver, of a closer therefor; a dead-lock toggle one arm of which is connected to said closer and the other arm to said load-receiver, the members of said toggle being out of alinement when the closer is shut; a cam; and means including a rod having projections operated by said cam for positively actuating the toggle, first to unlock the same and permit the closer to open, and, second, to lock the same and shut the closer.

38. In a machine of the class specified, the combination, with a load-receiver, of a closer pivoted to the discharge end thereof; a toggle composed of two members one of which is articulated to the closer and the other of which is attached to a shaft on the load-receiver; a crank-arm projecting from said shaft; a cam having an active and a locking portion; a rod having projections at its ends actuated by said cam, said projections engaging with the crank-arm and serving to actuate the toggle to permit the closer to open and to shut the same; and means for actuating said cam.

39. In a machine of the class specified, the combination, with a load-receiver having a closer, of means for actuating said closer; a shaft carrying a device for controlling said actuating means; a stop on said shaft; a regulator; and means controlled by said regulator and adapted to engage and to release said stop.

40. In a machine of the class specified, the combination, with a continuously-driven primary actuator, of secondary actuating mechanism involving a shaft, and a series of cams secured thereto; means for intermittingly arresting the movement of said shaft; weighing mechanism controlled by certain of said cams; and supply and valve mechanisms controlled by other of said cams.

41. In a machine of the class specified, the combination, with a primary actuating-shaft, of a secondary shaft carrying cams; weighing mechanism involving a load-receiver and a closer; force-feeding mechanism including a valve; means actuated by one of said cams for controlling the speed of the force-feeding mechanism; means actuated by another of said cams for controlling the movements of the valve; and means actuated by other of said cams for controlling the movements of the load-receiver and of the closer.

42. In a machine of the class specified, the combination, with force-feeding mechanism, of a shaft for actuating said mechanism; high and low speed pulleys secured to said shaft; a loose pulley secured to said shaft; a belt; a belt-shipper; a cam having active and locking portions for controlling the movements of said belt-shipper at the proper intervals; means for intermittingly stopping said shaft; and means for starting said cam when the stopping means are withdrawn.

43. In a machine of the class specified, the combination, with supply mechanism, of a gravity closing-valve for governing the passage of material therefrom; a load-receiver; a shaft having a cam; a connector between said cam and valve for positively opening said stream-controller; a stop-arm for limiting the movement of said cam; a latch; and a rod actuated by the load-receiver for withdrawing said latch.

44. In a machine of the class specified, the combination, with a load-receiver having a closer, of a latch in the form of a rod having a projection at its upper end; a stop-abutment carried by the load-receiver, the upper and lower faces of which are engaged by said latch; a cam-shaft; a cam thereon; and means for starting and stopping said cam-shaft.

45. In a machine of the class specified, the combination, with a primary actuator, of a secondary actuator comprising a cam-shaft; a series of cams carried by said shaft; weighing mechanism; supply mechanism; means actuated by said cams for controlling the weighing and supply mechanisms; a series of stop-arms carried by the cam-shaft; a series of latches adapted to engage said stop-arms at proper intervals; and means for withdrawing said latches in proper order to permit the cam-shaft intermittingly to rotate.

46. In a machine of the class specified, the combination, with weighing mechanism, of supply mechanism; valve mechanism; a cam-shaft having a series of cams each formed with active and locking portions, said cams controlling the operations of the weighing, supply, and valve mechanisms; a series of movement-limiters for controlling the intermittent action of said cam-shaft; and means for controlling the action of said movement-limiters.

47. In a machine of the class specified, the combination, with weighing mechanism and supply mechanism and valve mechanism, of a series of cams for controlling the movements of said mechanisms; a series of stop-arms cooperative with said cams; and a series of latches for intermittingly engaging said stop-arms.

48. In a machine of the class specified, the combination, with weighing mechanism, of means for supplying material thereto; a stream-controller; a cam-shaft; a series of cams carried thereby; means connecting said cams, said supply means, weighing mechanism, and stream-controller; a series of stop-arms mounted on the cam-shaft; a series of latches adapted to engage said stop-arms; and means for tripping said latches.

49. The combination, with the main cam-shaft of the machine, of a load-receiver; a regulator located below said load-receiver and adapted to receive the impact of the material discharged therefrom, and means actuated by the regulator for controlling the movement of said cam-shaft.

50. The combination, with an intermittingly-operating power-driven cam-shaft, of a load-receiver; a regulator for receiving the impact of the material discharged from said load-receiver; and means actuated by the regulator for controlling the movement of the cam-shaft.

51. The combination, with an intermittingly-operative cam device having a stop-arm, of a latch for said arm; a load-receiver having a closer; and a regulator controlling said latch, said regulator receiving the impact of the material discharged from the load-receiver.

52. In a weighing-machine, the combination, with weighing mechanism including a load-receiver having a closer, of a regulator having an arm; a latch controlled by the regulator; a shaft having a stop-arm adapted to engage said latch; and means carried by said shaft for controlling the operation of the weighing mechanism.

53. In a machine of the class specified, the combination, with a load-receiver, of a chute for receiving the material discharged from said receiver; a regulator movably connected to said chute; a latch controlled by said regulator; a shaft having a stop with which said latch engages; and means controlled by said shaft for governing the movement of the load-receiver.

54. In a machine of the class specified, the combination, with a load-receiver, of a pivoted regulator against which the material from said load-receiver is discharged; an abutment-arm carried by said regulator; a latch having means normally in engagement with said abutment-arm, whereby said latch is held out of action; a shaft having a stop with which said latch is adapted to engage; a device for locking the load-receiver while the load is being discharged; and means carried by said shaft for actuating said device.

55. In a machine of the class specified, the combination, with a load-receiver, of a pivoted regulator against which the material from said load-receiver is discharged; an abutment-arm carried by said regulator; a latch having a counterweight normally in engagement with said abutment-arm, whereby said latch is held out of action during the normal position of the regulator; a shaft having a stop-arm with which said latch is adapted to engage; a latch for locking the load-receiver while the load is being discharged; and a cam having active and locking portions carried by said shaft for actuating the load-receiver latch.

56. In a machine of the class specified, the combination, with weighing mechanism involving a load-receiver, of force-feeding mechanism for supplying material to said load-receiver; a secondary actuator; means carried by said actuator for controlling the movement of said feeding mechanism; and means controlled by the load-receiver for governing the movement of said secondary actuator; and a continuously-driven primary actuator in engagement with the secondary actuator.

57. In a machine of the class specified, the combination, with force-feeding mechanism, of weighing mechanism involving a load-receiver having a projection; a rotary secondary actuator; means carried by said actuator for controlling the speed of the feeding mechanism; means for intermittingly stopping said secondary actuator; and means controlled by the projection on the load-receiver for releasing said stopping means and thereby permitting the movement of the secondary actuator.

58. In a machine of the class specified, the combination, with feeding mechanism and means for operating the same, of weighing mechanism involving a load-receiver; a stream-controller; a rotary secondary actuator; means carried by the load-receiver for controlling the movement of said actuator; means carried by said secondary actuator for governing the movement of the stream-controller; and means also carried by said secondary actuator for controlling the operation of the feeding mechanism.

59. In a machine of the class specified, the combination, with feeding mechanism, of a stream-controller; weighing mechanism including a load-receiver; a rotary secondary actuator; means carried by said actuator for controlling the feeding mechanism; means carried by said actuator for controlling the movement of the stream-controller; a stop-arm carried by said secondary actuator; a latch for engaging said stop-arm and thereby arresting the movement of said secondary actuator; and means controlled by a part of the weighing mechanism for releasing said latch.

60. In a machine of the class specified, the combination, with supply mechanism, of weighing mechanism; a rotary secondary actuator; means carried thereby for controlling the movement of said weighing mechanism; a movement-limiter, including a stop-arm carried by the actuator and a latch mounted on the framework, for controlling the operation of said actuator; and means carried by a part of the weighing mechanism for governing the action of said movement-limiter.

61. In a machine of the class specified, the combination, with force-feeding mechanism, of gearing controlled by a belt-shipper for actuating said mechanism; a rotary secondary actuator; means carried thereby for operating the belt-shipper; and means for alternately stopping and starting said actuator.

62. In a machine of the class specified, the combination, with force-feeding mechanism, of gearing for actuating the same; a belt for driving said gearing; a pivoted belt-shipper; a rotary secondary actuator carrying means for operating said belt-shipper; and means for starting and stopping the secondary actuator.

63. In a machine of the class specified, the combination, with force-feeding mechanism including a belt for transferring material from the hopper, of gearing for actuating said force-feeding mechanism at different speeds; a series of pulleys for driving said gearing; a loose pulley; a belt-shipper; a secondary actuator; a cam having active and locking portions mounted on said secondary actuator; a movement-limiter consisting of a stop-arm carried by the actuator and a latch mounted on the framework; and a continuously-driven primary actuator.

64. In a machine of the class specified, the combination, with force-feeding mechanism, of gearing for driving said mechanism at different speeds; a belt for actuating said gearing; a belt-shipper; a rotary secondary actuator carrying a stop-arm; a load-receiver; a pivoted latch for engaging said stop-arm; and means controlled by the load-receiver for tripping said latch.

65. In a machine of the class specified, the combination, with force-feeding mechanism, of gearing for actuating said mechanism at different speeds; a series of pulleys for operating said gearing; a belt; a belt-shipper; a secondary actuator; a cam having active and locking portions carried by said actuator; a stop-arm also carried by said actuator; a counterweighted latch normally tending to engage said stop-arm; a load-receiver; and means controlled by the movement of said load-receiver for releasing said latch.

66. In a machine of the class specified, the combination, with force-feeding mechanism and gearing for actuating the same at different speeds, of a series of pulleys for operating said gearing; a belt; a pivoted belt-shipper; a secondary actuator; a disk having a cam-groove with active and locking portions connected with said actuator; a connector between said disk and the belt-shipper; a stop-arm connected with the actuator; a load-receiver having a projection; a pivoted counterweighted latch normally tending to engage said stop-arm; and a rod adapted to be engaged by the projection on the load-receiver, said rod being pivoted to said latch.

67. In a machine of the class specified, the combination, with force-feeding mechanism, of a stream-controller; a secondary actuator; means carried by said actuator for governing the movement of said stream-controller; stop-arms carried by the actuator; latches alternately engaging said stop-arms; means carried by the load-receiver for tripping one of said latches; and a device controlled by the valve-actuating means for tripping the other of said latches.

68. In a machine of the class specified, the combination, with force-feeding mechanism, of means for actuating said mechanism at different speeds; a series of pulleys; a belt adapted to be thrown into engagement with any pulley of the series; a belt-shipper; a secondary actuator; means carried by said actuator for operating said belt-shipper; a stream-controller; a connector attached to said stream-controller; means carried by the secondary actuator for operating said connector; stop-arms carried by said actuator; latches pivoted to the frame and adapted alternately to engage said stop-arms; a load-receiver; means controlled by the movement of said load-receiver for tripping one of said latches; and means controlled by the connector between the valve and its operating means for tripping the other of said latches.

69. In a machine of the class specified, the combination, with supply mechanism, of a stream-controller; a secondary actuator; a cam having active and locking portions carried by said actuator; a connector between said cam and the stream-controller; a stop-arm carried by said secondary actuator; a latch for engaging said stop-arm; and means carried by the connector between the stream-controller and its actuating-cam for tripping said latch.

70. In a machine of the class specified, the combination, with supply mechanism, of a stream-controller; a cam having active and locking portions; a connector between said cam and stream-controller; a stop-arm for controlling the movement of said cam; a latch adapted to engage said stop-arm; and means controlled by the connector between the valve and the valve-actuating cam for tripping said latch.

71. In a machine of the class specified, the combination, with supply mechanism, of a pivoted valve for regulating the passage of material therefrom; a disk having a cam-groove with active and locking portions; a connector between said cam-groove and valve, said connector having a projection; a stop-arm for controlling the movement of the cam; a pivoted counterweighted latch adapted to engage said stop-arm; and an arm connected with said latch with which the projection on said connector engages.

72. In a machine of the class specified, the combination, with means for supplying material, of a valve for controlling the passage of such material; a cam-shaft and means for actuating the same; a cam; a connection between said cam and valve; weighing mechanism; means for arresting the valve at a certain period to reduce the volume of the supply-stream; a stop-arm carried by the cam-shaft; a latch for said stop-arm; and means controlled by said connection for tripping said latch.

73. In a machine of the class specified, the combination, with means for supplying material, of a valve; means for actuating the same; a load-receiver having a projection; a closer for said load-receiver; a latch for blocking the movement of the load-receiver while the closer is being opened and shut; means for actuating said latch; a cam-shaft; a cam thereon; means controlled by said cam for positively operating the closer; a stop-arm carried by the cam-shaft; a latch for said stop-arm; and means for releasing said latch.

74. In a machine of the class specified, the combination, with a load-receiver, of a closer connected therewith; dead-lock toggles for actuating said closer; a cam-shaft and cam; a rod having projections and actuated by said cam to open and shut the closer; a stop carried by the cam-shaft; a latch for engaging said stop and thereby arresting the movement of said shaft; and means for releasing said latch.

75. In a machine of the class specified, the combination, with a load-receiver, of a closer pivoted thereto; dead-lock toggles connected to said closer and united by a shaft connected to the load-receiver; a rod having projections at its end for actuating said toggles positively to open and shut the closer; a cam having active and locking portions for operating said rod; a stop-arm carried by the cam-shaft; a pivoted latch adapted to engage said stop-arm and arrest the motion of said shaft; and means for releasing said latch.

76. In a machine of the class specified, the combination, with beam mechanism, of a load-receiver supported thereby; a closer pivoted to said load-receiver; a dead-lock toggle connected to said closer and to said load-receiver; a rod having projections adapted to engage with an arm of said toggle for the purpose of actuating the same to open and shut the closer; and a cam for positively actuating said rod.

77. In a machine of the class specified, the combination, with means for supplying material, of a pivoted valve for controlling the passage of such material; weighing mechanism; means carried thereby for arresting the movement of the valve at a certain point to reduce the volume of the supply-stream; a secondary actuator; a grooved cam having active and locking portions carried by said secondary actuator; a connector between said cam and the valve; a stop-arm and latch for controlling the movement of said cam when the valve is in its wide-open position; means controlled by the weighing mechanism for tripping said stop-arm; a secondary stop-arm and latch for arresting the movement of the secondary actuator and said cam when the valve is in its drip position; and means carried by the connector between the cam and valve for tripping said secondary latch.

78. In a machine of the class specified, the combination, with force-feeding mechanism, of gearing for driving the same; a cam and connections for controlling the speed of said gearing; a valve; a cam for actuating the same; a connector between said cam and valve; means for arresting the closing movement of the valve at a certain period to reduce the volume of the supply-stream; a pair of movement-limiters for governing the motion of the cam-shaft; and means for controlling the action of said movement-limiters.

79. In a machine of the class specified, the combination, with means for supplying material, of a valve for controlling the passage of such material; a load-receiver; a shaft having a cam; a latch actuated by said cam for controlling the movement of said load-receiver; a stop-arm carried by the cam-shaft; a counterweighted latch adapted to engage with said stop-arm; and means for releasing said latch.

80. In a machine of the class specified, the combination, with force-feeding mechanism, of a valve for regulating the supply of material therefrom; a load-receiver; means for supporting said load-receiver; a closer pivoted to said load-receiver; toggles for actuating said closer; a shaft; a series of cams carried by said shaft, each cam having active and locking portions; a series of stop-arms fixed to the cam-shaft at different points in the length thereof; a series of latches for intermittingly engaging said stop-arms; and means for releasing said latches.

81. In a machine of the class specified, the combination, with supply mechanism, of a valve for regulating the quantity of material delivered by said supply mechanism; weighing mechanism including a load-receiver; a secondary actuator; a series of cams carried by said actuator; a primary actuator in connection with said secondary actuator; a rod for controlling the movement of the valve, actuated by one of said cams, said rod having a projection; a latch for locking the load-receiver in its extreme positions, actuated by another of said cams; a series of devices for intermittingly stopping the secondary actuator; and means controlled by the movements of the load-receiver and by the projection on the valve-rod, for intermittingly releasing said secondary actuator.

82. In a machine of the class specified, the combination, with force-feed-supply mechanism, of a valve for regulating the quantity of material delivered by said mechanism; weighing mechanism including a load-receiver; a closer and means for actuating the same, carried by said load-receiver; a regulator for receiving the impact of material discharged from said load-receiver; a secondary actuator carrying a series of cams; means controlled by said cams for governing the movement of the supply mechanism, the valve, the load-receiver, and the closer for said load-receiver; a series of stop-arms carried by the cam-shaft and located at different positions radially of said shaft; a series of counterweighted latches for intermittingly stopping said shaft; means for releasing said latches at the proper times to permit the shaft to resume its movement; and means normally adapted for continuously driving said shaft.

83. In a machine of the class specified, the combination, with force-feed-supply mechanism, of a pivoted valve for regulating the quantity of material delivered by said mechanism; weighing mechanism including a load-receiver; a closer pivoted to said load-receiver; toggle connections between said closer and said load-receiver; a main cam-shaft; means adapted continuously to operate said cam-shaft; cams carried by said shaft; means controlled by said cams for actuating the force-feed mechanism and the valve; means controlled by one of said cams for positively releasing and for shutting the closer; a latch controlled by one of said cams for preventing accidental movement of the closer; a regulator adapted to receive the impact of material discharged from the load-receiver; a series of counterweighted latches; means for actuating said latches; and a series of stop-arms carried by the cam-shaft.

84. In a machine of the class specified, the combination, with beam mechanism, of a load-receiver supported thereby; a closer pivoted to said load-receiver; toggle connections for actuating said closer; a shaft carried by the load-receiver, to which one member of said toggle connections is secured; a crank-arm attached to said shaft; a rod having separated projections at its upper end adapted to engage and operate said crank-arm; a cam for actuating said rod; means carried by the framework for guiding said rod; and means for actuating said cam.

85. In a machine of the class specified, the combination, with weighing mechanism including a load-receiver, of a closer pivoted to said load-receiver; toggle connections between said closer and said load-receiver; a crank-arm carried by one of said toggle connections; a rod having separated projections at its upper end; means carried by the framework in which said rod is mounted and guided; a cam-shaft; a disk carried by said shaft and having a cam-groove with active and locking portions for actuating said rod; and means for stopping and starting said cam-shaft.

86. In a machine of the class specified, the combination, with weighing mechanism including a load-receiver, of a closer pivoted to said load-receiver; rods connected to said closer; arms attached to the shaft, passing through the load-receiver, to which said rods are pivoted; a crank-arm carried by said shaft; a rod having separated projections at its upper end and a forked lower end for actuating said crank-arm; a cam-shaft; a cam thereon for actuating said rod; a latch for locking the closer-actuating devices against accidental displacement; a cam and intermediate connections for controlling the movement of said latch; and means for starting and stopping the cam-shaft.

FRANCIS H. RICHARDS.

Witnesses:
F. N. CHASE,
JOHN O. SEIFERT.